(12) United States Patent
Kitano et al.

(10) Patent No.: US 6,575,870 B2
(45) Date of Patent: Jun. 10, 2003

(54) DRIVING FORCE CONTROL SYSTEM FOR FRONT-AND-REAR WHEEL DRIVE VEHICLES

(75) Inventors: Kazuhiko Kitano, Saitama-ken (JP);
Naoki Uchiyama, Saitama-ken (JP);
Akihiro Yamamoto, Saitama-ken (JP);
Tooru Nakasako, Saitama-ken (JP);
Takahiro Yonekura, Saitama-ken (JP);
Toshihiko Fukuda, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/904,535

(22) Filed: Jul. 16, 2001

(65) Prior Publication Data

US 2002/0013194 A1 Jan. 31, 2002

(30) Foreign Application Priority Data

Jul. 21, 2000 (JP) ........................... 2000-220828
Jul. 27, 2000 (JP) ........................... 2000-226876

(51) Int. Cl.$^7$ .............................. B60R 1/00; B60R 6/00; B60R 1/02; B60R 16/00
(52) U.S. Cl. .............................. 477/3; 477/15; 701/22; 701/53; 701/93; 180/65.2; 180/65.3
(58) Field of Search .................. 477/3, 7, 15, 20; 701/22, 53, 70, 93, 82, 89; 180/65.2, 65.3, 65.5, 242, 243, 165, 65.4

(56) References Cited

U.S. PATENT DOCUMENTS 5,495,906 A * 3/1996 Furutani ............... 180/242
5,722,911 A * 3/1998 Ibaraki et al. ........ 180/65.3
5,788,005 A * 8/1998 Arai .................... 180/247
6,205,379 B1 * 3/2001 Morisawa et al. ..... 180/165
6,328,671 B1 * 12/2001 Nakajima et al. ..... 180/65.4

FOREIGN PATENT DOCUMENTS

| JP | 08126116 | * 5/1996 | ........... B60L/11/12 |
| JP | 200079833 | * 3/2000 | ......... B60K/17/356 |

* cited by examiner

*Primary Examiner*—Sherry Estremsky
*Assistant Examiner*—Tisha D. Lewis
(74) *Attorney, Agent, or Firm*—Arent Fox Kintner Plotkin & Kahn, PLLC

(57) ABSTRACT

A driving force control system for a front-and-rear wheel drive vehicle, which is capable of charging a battery based on a traveling condition of the vehicle. The front-and-rear wheel drive vehicle is driven while switching between a drive mode for driving front wheels by an engine and driving rear wheels by a motor, and a recharge mode for recovering running energy of the vehicle and charging the battery with the recovered running energy. Parameters (accelerator pedal opening ΘAP and a vehicle speed Vcar, or drive wheel speeds of the respective front and rear wheels) indicative of a driving condition of the vehicle are detected. A traveling condition of the vehicle is determined based on the parameters. It is determined, based on the traveling condition of the vehicle and the state of charge of the driving energy in the drive source, whether charging of the battery is to be executed.

12 Claims, 17 Drawing Sheets

F I G. 1 5
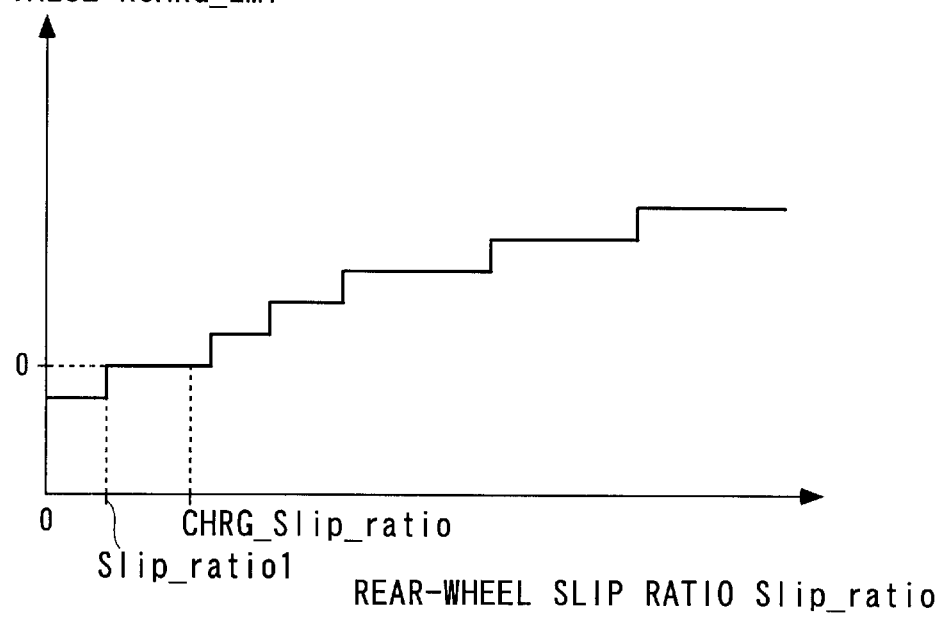

DRIVING FORCE CONTROL SYSTEM FOR FRONT-AND-REAR WHEEL DRIVE VEHICLES

BACKGROUND OF THE INVENTION

1. Field of the Invention

This invention relates to a driving force control system for a front-and-rear wheel drive vehicle of a type which drives front wheels and rear wheels independently by first and second prime movers, respectively.

2. Description of the Prior Art

Conventionally, a driving force control system of the above-mentioned kind was proposed e.g. by Japanese Patent Publication (Kokai) No. 2000-79833. The front-and-rear wheel drive vehicle has front wheels thereof driven by an engine and rear wheels thereof driven by a motor. A battery as a drive source for the motor can be charged by recovering running energy of the vehicle. Further, in the driving force control system, on condition that the remaining charge of the battery is equal to or smaller than a predetermined value, and when a driver's operation for accelerating the vehicle has been carried out e.g. by stepping on an accelerator pedal, the gear ratio of a continuously variable transmission is changed toward a higher gear ratio side by a predetermined amount. As a result, a surplus torque is generated, and the battery is charged by a regenerative braking torque corresponding to the surplus torque. This battery charge is continued until the remaining charge of the battery reaches the predetermined value. According to the proposed driving force control system, the charging of the battery is carried out not only during deceleration of the vehicle, but also at other times as described above, whereby the remaining charge of the battery is prevented from becoming insufficient.

However, in the above conventional driving force control system, when the remaining charge of the battery is equal to or smaller than the predetermined value, recharge traveling of the vehicle is carried out unconditionally in response to operation of the accelerator pedal so as to preserve a required amount of remaining charge. This means that despite the fact that a high driving force is desired by the driver who is demanding acceleration of the vehicle, part of the output of the engine is consumed as a regenerative braking torque for charging the battery, which increases load on the engine, thereby causing degradation of fuel economy. Further, the change gear ratio of the continuously variable transmission is changed toward the higher gear ratio side due to the recharge traveling, which can cause a downshift unexpected by the driver. This downshift degrades drivability while giving an uncomfortable feeling to the driver. In addition, since the charging of the battery is simply carried out until the remaining charge reaches the predetermined value, in some operating condition of the vehicle, sudden generation and loss of the regenerative braking torque can occur at the start and end of the recharge traveling, causing torque changes. This also leads to degradation of drivability.

In the above situation, the rear wheels receive the regenerative braking torque acting in a decelerating direction, whereas the front wheels receive a drive torque from the engine, which acts in an accelerating direction. As a result, the front wheels and the rear wheels are driven in respective opposite directions, and at the same time, the torque acting on the front wheels is increased by the amount of the regenerative braking torque acting on the rear wheels. Therefore, e.g. during running of the vehicle on a low friction road, the difference in rotational speed between the front wheels and the rear wheels is increased, whereby slippage of the rear wheels can be also increased, throwing lateral forces acting on the respective front-and-rear wheels out of balance, which makes the behavior of the vehicle unstable.

SUMMARY OF THE INVENTION

It is a first object of the invention to provide a driving force control system for a front-and-rear wheel drive vehicle, which is capable of charging a battery properly and easily depending on a traveling condition of the vehicle and in response to the intention of the driver, thereby improving fuel economy and drivability of the vehicle.

It is a second object of the invention to provide a driving force control system for a front-and-rear wheel drive vehicle, which is capable of limiting the difference in rotational speed between front wheels and rear wheels, which is produced during a recharge mode for charging a drive source of a second prime mover with driving energy, within a proper range dependent on a state of a road surface and a traveling condition of the vehicle, thereby ensuring traveling stability of the vehicle.

To attain the above first and second objects, the present invention provides a driving force control system for a front-and-rear wheel drive vehicle that is driven while switching between a drive mode for driving first drive wheels as one pair of respective pairs of front drive wheels and rear drive wheels by a first prime mover and driving second drive wheels as another pair of the respective pairs by a second prime mover, and a recharge mode for recovering running energy of the vehicle to thereby charge a drive source of the second prime mover with the running energy recovered as driving energy.

The driving force control system according to the invention is characterized by comprising:

parameter detecting means for detecting a parameter indicative of a driving condition of the vehicle;

traveling condition-determining means for determining a traveling condition of the vehicle based on the parameter;

driving energy charge execution-determining means for determining, based on the traveling condition of the vehicle and a state of charge of the driving energy in the drive source, whether or not charging of the drive source with the driving energy is to be executed; and energy charge-executing means for executing the charging of the drive source with the driving energy.

According to the driving force control system of the invention, it is determined, based on the traveling condition of the vehicle and the state of charge of the driving energy in the drive source, whether or not charging of the drive source with the driving energy is to be executed. This makes it possible to improve performance of the vehicle, that is, enhance fuel economy and drivability of the vehicle can be enhanced, and ensure traveling stability of the same.

Preferably, to attain the first object, the parameter detecting means includes accelerator pedal opening-detecting means for detecting an accelerator pedal opening, and vehicle speed-detecting means for detecting a vehicle speed, the traveling condition-determining determining means including desired driving force-calculating means for calculating a desired driving force based on the detected accelerator pedal opening and the detected vehicle speed, reference driving force-storing means for storing a reference driving force which is set, based on a driving force of the vehicle required for cruising, to a larger value than the driving force, and driving force comparison means for performing a comparison between the desired driving force and the reference driving force, and the driving energy charge execution-determining means including driving energy charge-permitting means for permitting the charging of the drive source with the driving energy when the driving force comparison means determines that the desired driving force is smaller than the reference driving force.

According to this driving force control system, the reference driving force is set, based on the driving force of the vehicle required for the cruising, to a predetermined value which is larger than the driving force, and when it is determined that the desired driving force is smaller than the reference driving force, the charging of the drive source of the second prime mover with the driving energy by recovery of the running energy of the vehicle is permitted, whereby execution of the recharge mode is started. Thus, in a cruising condition of the vehicle, the drive source of the second prime mover is charged with the driving energy when the desired driving force becomes smaller than the reference driving force. In this case, the vehicle is cruising or running at a constant speed, so that the desired driving force for the whole vehicle is small, and hence an increase in load on the first prime mover due to recovery of the running energy is small. On the other hand, in an accelerating state of the vehicle e.g. with its accelerator pedal being stepped on, the desired driving force increases and exceeds the reference driving force, so that the charging of the drive source with the driving energy is inhibited. Thus, it is possible to charge the drive source of the second prime mover with the driving energy only when there is no driver's demand for acceleration, without applying extra load on the drive source of the first prime mover, so that fuel economy and drivability of the vehicle can be further improved than the prior art.

Further, the reference driving force serves not only as a criterion for determining whether or not the vehicle is in a cruising condition suitable for the charging of the driving energy, but also as a criterion for executing the charging of the driving energy, so that simply by presetting the reference driving force and storing the same in the system, it is possible to perform determination as to the cruising condition of the vehicle and carry out charging of driving energy, easily and properly.

More preferably, the reference driving force is a driving force of the vehicle required for cruising on a road having a predetermined upward slope.

According to this preferred embodiment, when the vehicle is cruising on a road having a smaller slope than the predetermined upward slope, the desired driving force is always smaller than the reference driving force, and this makes it possible to ensure a traveling region for executing the charging of driving energy, whereby the charging of the drive source with the driving energy can be carried out reliably. Further, the reference driving force can be set easily by calculation.

More preferably, the driving force control system further comprises stored driving energy amount-detecting means for detecting a stored amount of the driving energy in the drive source, and reference driving force-correcting means for correcting the reference driving force according to the detected stored amount of the driving energy.

According to this preferred embodiment, since the reference driving force is corrected according to an actually stored amount of driving energy, it is possible to charge the drive source with the driving energy efficiently and properly in accordance with a degree of requirement.

More preferably, the driving force control system further comprises driving energy charging-rate setting means for setting a charging rate at which the drive source is charged with the driving energy, according to a difference between the desired driving force and the reference driving force.

According to this preferred embodiment, it is possible to properly set the charging rate at which the drive source is charged with the driving energy according to the difference between the desired driving force and the reference driving force as well as to start and terminate recharge traveling in a state of a regenerative braking torque (amount of drag torque) being very small. As a result, sudden generation and loss of regenerative braking torque at the start and end of recharge traveling is prevented, which makes it possible to execute the recharge traveling without giving any uncomfortable feeling to the driver.

Preferably, to attain the above second object, the parameter detecting means includes first drive wheel speed-detecting means for detecting a speed of the first drive wheels, and second drive wheel speed-detecting means for detecting a speed of the second drive wheels, the traveling condition-determining means including drive wheel speed comparison means for performing a comparison between the detected speed of the first drive wheels and the detected speed of the second drive wheels, the driving force control system further comprising driving energy charging rate-limiting means for limiting a charging rate at which the drive source is charged with the driving energy, when the drive wheel speed comparison means determines, during the recharge mode, that the speed of the second drive wheels has become lower than the speed of the first drive wheels by more than a predetermined value.

According to this driving force control system, the speed of the first drive wheels driven by the first prime mover and the speed of the second drive wheels driven by the second prime mover are detected, and the detected speeds of the respective first and second drive wheels are compared with each other by the drive wheel speed comparison means. Then, during the recharge mode for recovering running energy of the vehicle to charge the drive source of the second prime mover with the recovered running energy, when the speed of the second drive wheels is determined to have become lower than the speed of the first drive wheels by more than a predetermined value, the charging rate of driving energy is limited by the driving energy charging rate-limiting means.

When the speed of the second drive wheels becomes lower than the speed of the first drive wheels by some margin due to regenerative braking by the second drive wheels during the recharge mode, the charging rate at which the drive source of the second prime mover is charged with the driving energy, i.e. the regenerative braking torque of the second drive wheels, is limited, so that the difference in speed between the first drive wheels and the second drive wheels, i.e. the slippage of the second drive wheels, can be caused to remain within a proper range. As a result, even when the vehicle is traveling on a low-friction road or the like, it is possible to positively reduce slippage of the second drive wheels during the recharge mode, thereby ensuring traveling stability of the vehicle.

More preferably, the driving energy charging rate-limiting means limits the charging rate of the driving energy in dependence on a degree of decrease in the speed of the second drive wheels relative to the speed of the first drive wheels.

According to this preferred embodiment, since the charging rate of the driving energy is limited according to the degree of decrease in the speed of the second drive wheels relative to the speed of the first drive wheels, it is possible to more properly control the regenerative braking torque of the second drive wheels depending on the magnitude of an actual frictional resistance of the road surface on which the vehicle is running, to thereby ensure more excellent traveling stability of the vehicle.

More preferably, the recharge mode includes a decelerating traveling-time recharge mode to be executed during decelerating traveling of the vehicle, and a non-decelerating traveling-time recharge mode to be executed during non-decelerating traveling of the vehicle, the predetermined value for use in the non-decelerating traveling-time recharge mode being set to a smaller value than the predetermined value for use in the decelerating traveling-time recharge mode.

In the non-decelerating traveling-time recharge mode, the second drive wheels receive regenerative braking torque acting in a decelerating direction, whereas the first drive wheels receive drive torque acting in an accelerating direction. As a result, the first and second drive wheels are driven in respective opposite directions, which is apt to give an uncomfortable feeling to the driver. On the other hand, in the decelerating traveling-time recharge mode, since the first and second drive wheels are driven in the same direction, the driver never feels such uncomfortableness. Therefore, according to this preferred embodiment, since the predetermined value for use in determining whether or not limitation should be imposed on the charging rate of driving energy is set as above, the limitation on the charging rate is more promptly started in the non-decelerating traveling-time recharge mode than in the decelerating traveling-time recharge mode. This makes it is possible to maintain the drivability of the vehicle properly in accordance with a traveling condition of the vehicle.

The above and other objects, features, and advantages of the invention will become more apparent from the following detailed description taken in conjunction with the accompanying drawings.

BRIEF DESCRIPTION OF THE DRAWINGS

FIG. 15 is an enlarged view of an XV portion of the FIG. 14 table;

DETAILED DESCRIPTION OF THE PREFERRED EMBODIMENTS

The invention will now be described in detail with reference to the drawings showing preferred embodiments thereof.

Figure 1:
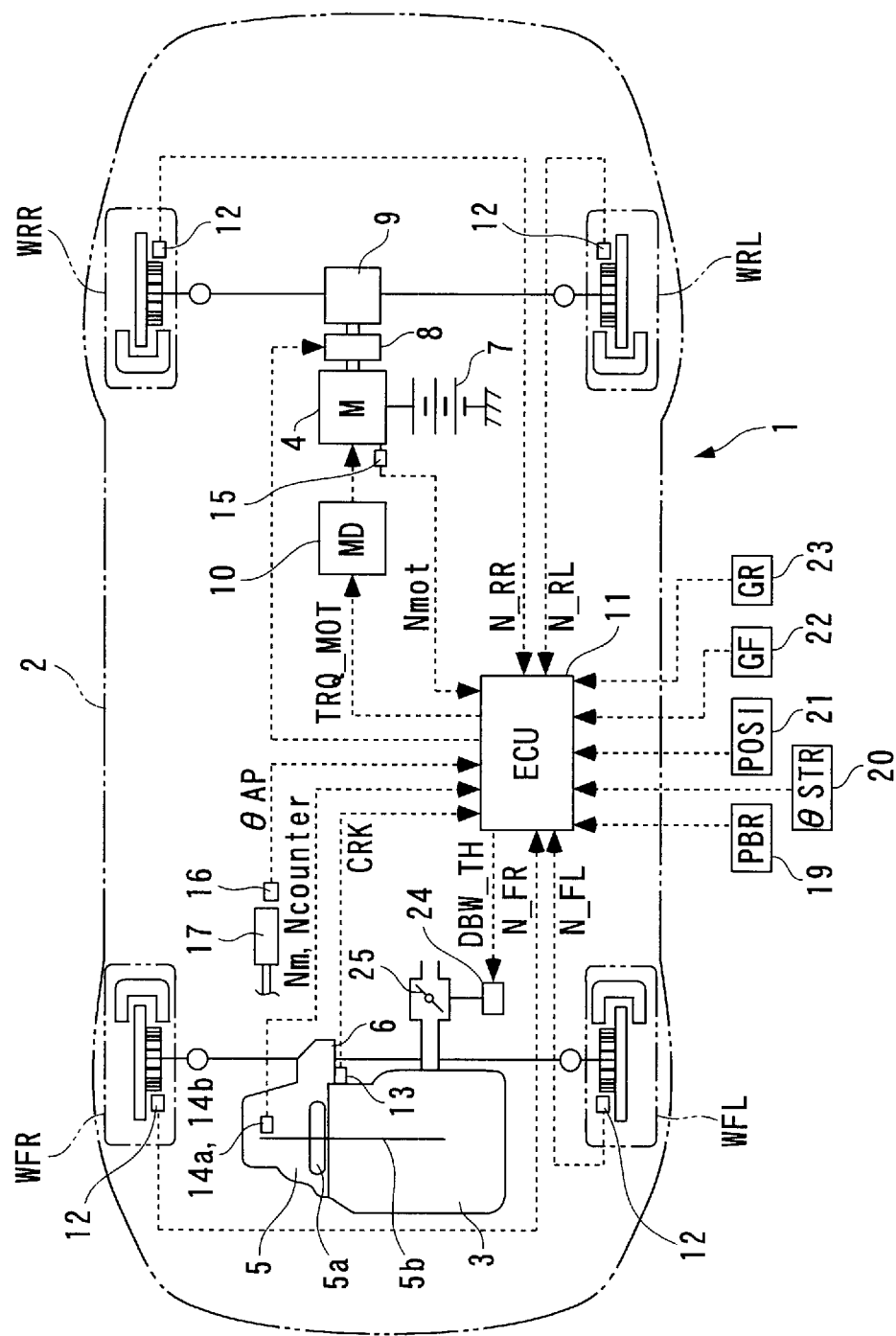
FIG. 1 is a view schematically showing the whole arrangement of a front-and-rear wheel drive vehicle incorporating a driving force control system according to a first embodiment of the invention.

FIG. 1 schematically shows the whole arrangement of a front-and-rear wheel drive vehicle (hereinafter simply referred to as "the vehicle") 2 incorporating a driving force control system 1 according to the invention. As shown in the figure, the vehicle 2 has left and right front wheels WFL, WFR (generically, hereinafter referred to as "the WF") driven by an internal combustion engine 3 and left and right rear wheels WRL, WRR (generically, hereinafter referred to as "the WR") driven by an electric motor (hereinafter simply referred to as "the motor") 4.

The engine 3 is transversely mounted in a front portion of the vehicle 2 and connected to the front wheels WF via an automatic transmission 5 having a torque converter 5a, and a front differential 6.

The motor 4 is connected to a battery 7 as a drive source therefor as well as to the rear wheels WR via an electromagnetic clutch 8 and a rear differential 9. As long as the motor 4 is driven by the battery 7 (drive mode) and at the same time the electromagnetic clutch 8 is connected to the motor 4, the rear wheels WR are driven by the motor 4, whereby the vehicle 2 is in a four-wheel drive state. The output of the motor 4 can be changed as required within a range up to 12 kW. The motor 4 also functions as a generator for generating electric power, when driven for rotation by a braking energy of the vehicle 2 (e.g. decelerating regeneration mode), to charge the battery 7 with the generated electric power (regenerative energy). A remaining charge SOC of the battery 7 is calculated based on detected current/voltage values of the battery 7, by an ECU 11 referred to hereinafter.

The motor 4 is connected to the ECU 11 via a motor driver 10. The motor driver 10 under the control of the ECU 11 controls switching of the motor 4 e.g. between the drive mode and the decelerating regeneration mode, setting of a maximum output of the motor 4, and a drive torque during the drive mode. Further, the motor driver 10 controls regeneration amount (charging rate) e.g. during the decelerating regeneration mode. The connection and disconnection of the electromagnetic clutch 8 is also controlled by the ECU 11 which controls supply and stop of supply of electric current to a solenoid, not shown, of the electromagnetic clutch 8.

The left and right front wheels WFL, WFR and the left and right rear wheels WRL, WRR are each provided with a wheel rotational speed sensor 12 of a magnetic pickup type, from which pulse signals indicative of sensed rotational speeds N_FL, N_FR, N_RL, N_RR of the respective wheels are delivered to the ECU 11. The ECU 11 calculates an average value N_Fwheel of left and right front-wheel rotational speeds, an average value of N_Rwheel of left and right rear-wheel rotational speeds, a vehicle speed Vcar, and so forth from the pulse signals.

The engine 3 has a crankshaft, not shown, to which is mounted a crank angle position sensor 13 which delivers to the ECU 11 a crank pulse signal CRK whenever the crankshaft rotates through a predetermined angle. Further, mounted to a main shaft 5b of an automatic transmission 5 and a counter shaft, not shown, of the same are a main shaft rotational speed sensor 14a of a magnetic pickup type and a counter shaft rotational speed sensor 14b of the same type, respectively. The two sensors 14a, 14b also output to the ECU 11 respective pulse signals indicative of a sensed rotational speed Nm of the main shaft 5b and a rotational speed Ncounter of the counter shaft. The ECU 11 calculates an engine rotational speed NE based on the crank pulse signal CRK, and then calculates a speed ratio e of a torque converter 5a from the engine rotational speed NE and the main shaft rotational speed Nm (e=Nm/NE). Further, a motor rotational speed sensor 15 formed by a resolver is mounted to the motor 4 to output a pulse signal indicative of a sensed rotational speed Nmot of the motor 4. This signal is also delivered to the ECU 11.

Further, the ECU 11 receives from an accelerator pedal opening sensor 16, a signal indicative of a sensed degree of opening (accelerator pedal opening) θAP including ON/OFF (stepped-on/released) states of the accelerator pedal 17. Still further, the ECU 11 is supplied with a signal indicative of a sensed braking pressure PBR from a braking pressure sensor 19 mounted to a master cylinder of a brake, not shown, a signal indicative of a sensed steering angle θSTR of a steering wheel, not shown, from a steering angle sensor 20, a signal indicative of a sensed shift lever position POSI of the automatic transmission 5 from a shift position sensor 21, and signals indicative of sensed accelerations GF, GR of the respective front-and-rear wheels WF, WR from acceleration sensors 22, 23.

The ECU 11 is formed or implemented by a microcomputer including a RAM, a ROM, a CPU, and an I/O interface, none of which are shown. The ECU 11 detects a traveling condition of the vehicle 2 based on the signals from the above various sensors, and determines a control mode. Further, the ECU 11 calculates a desired driving force FCMD, a desired front-wheel driving force FCMD_ENG and a desired rear-wheel driving force FCMD_MOT, based on the results of the detection and determination. Then, a drive signal DBW_TH based on the calculated desired front-wheel driving force FCMD_ENG is delivered to an actuator 24 of a DBW type, whereby an opening degree of the throttle valve 25 (hereinafter referred to as "the throttle valve opening θTH") is controlled to control the driving force of the engine 3. On the other hand, a required motor torque signal TRQ_MOT based on the calculated desired rear-wheel driving force FCMD_MOT is delivered to the motor driver 10 to thereby control the driving force of the motor 4.

Figure 2:
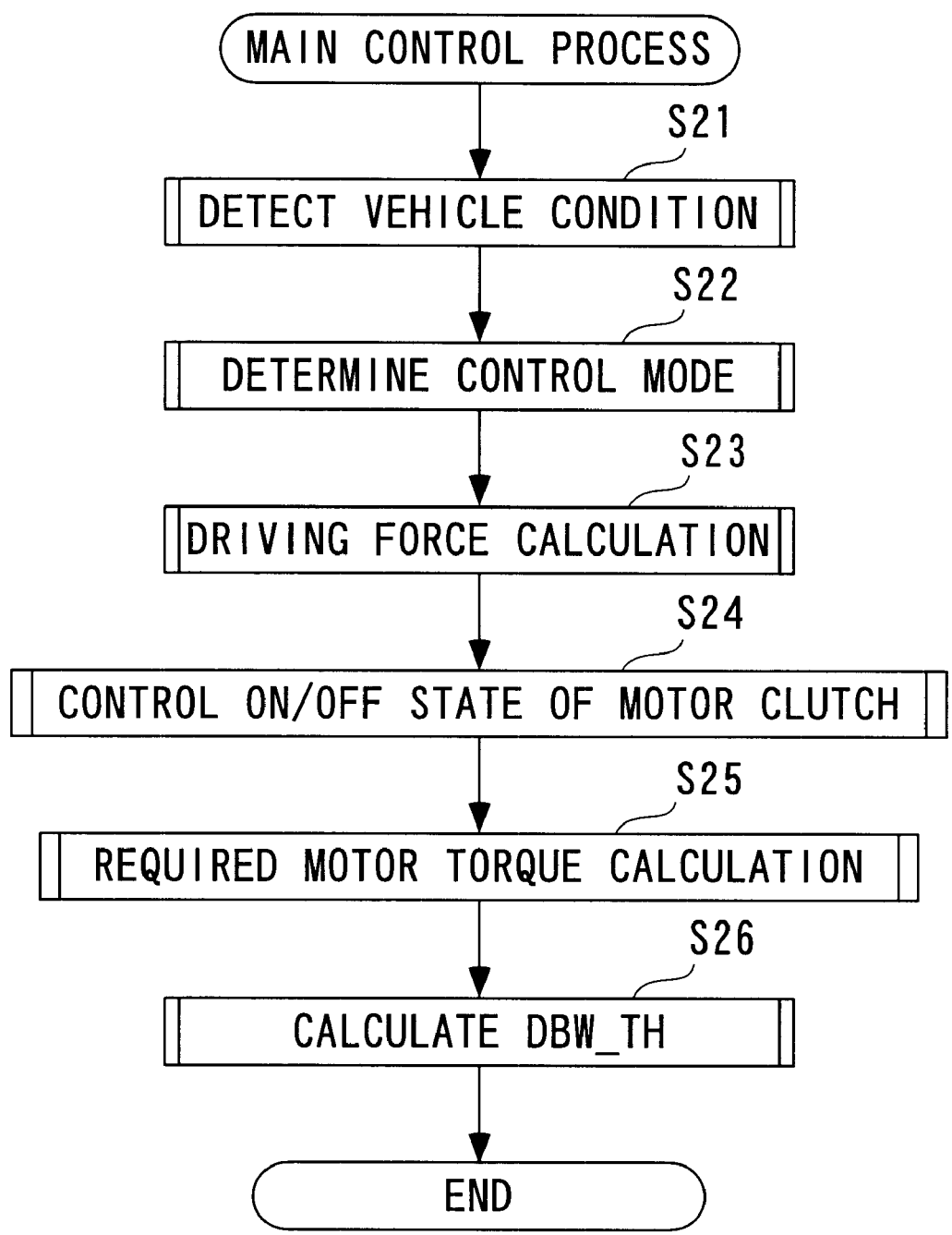
FIG. 2 is a flowchart showing a main flow of a driving force control process.

FIG. 2 shows a main flow of a control process executed by the ECU 11. This program is carried out at predetermined time intervals (e.g. 10 ms). In this control process, first, operating conditions of the vehicle 2 are detected at a step S21. More specifically, parameter signals detected by the aforementioned sensors are read in, and based on the parameter signals, predetermined arithmetic operations, such as calculations of the average value N_Fwheel of left and right front-wheel rotational speeds, the average value N_Rwheel of left and right rear-wheel rotational speeds, the vehicle speed Vcar and a rear-wheel slip ratio Slip_ratio, are carried out, and at the same time, it is determined which traveling condition of forward traveling, reverse traveling and stoppage the vehicle 2 is now in.

Then, at a step S22, the present control mode of the vehicle 2 is determined based on the shift lever position POSI of the automatic transmission 5 and the ON/OFF state of the accelerator pedal (hereinafter referred to as "the AP") 17 as well as on the traveling condition of the vehicle 2, which were detected at the step S21. More specifically, if the vehicle 2 is in the forward traveling condition or in the reverse traveling condition with the AP 17 in its ON state, it is determined that the control mode is a forward drive mode or a reverse drive mode (these two modes are hereinafter generically referred to as "the drive mode"), whereas if the vehicle 2 is in the forward traveling condition or in the reverse traveling condition with the AP 17 in its OFF state, it is determined that the control mode is a forward decelerating regeneration mode or a reverse decelerating regeneration mode (these two modes are hereinafter generically referred to as "the decelerating generation mode" or "decelerating travel time recharge mode"). Further, if the vehicle 2 is in stoppage, the control mode is determined as a stoppage mode. When the control mode is the decelerating generation mode, the battery 7 is basically charged by utilizing the regenerative braking torque.

At the following step S23, the desired driving force FCMD for the whole vehicle 2, the desired driving force FCMD_ENG for the front wheels, and the desired driving force FCMD_MOT for the rear wheels are calculated according to the control mode determined at the step S22. This step will be described in detail hereinafter.

Then, ON/OFF control of the electromagnetic clutch 8 is executed at a step S24. More specifically, it is determined, based on the vehicle speed Vcar and a differential rotational speed between the motor 4 and the rear wheels WR, whether the electromagnetic clutch 8 is to be turned on or off, and then the electromagnetic clutch 8 is turned on or off based on a result of the determination.

Then, at a step S25, the torque TRQ_MOT required for the motor 4 is calculated based on the desired rear-wheel driving force FCMD_MOT calculated at the step S23 and the ON or OFF state of the electromagnetic clutch 8 controlled at the step S24, and thereafter a drive signal generated based on the calculated torque TRQ_MOT is delivered to the motor driver 10 to control the driving force of the motor 4.

Next, at a step S26, an actuator output value DBW_TH is calculated, based on the desired front-wheel driving force FCMD_ENG calculated at the step S23, and the drive signal generated based on the calculated value DBW_TH is delivered to the actuator 24 to control the throttle valve opening θTH, whereby the driving force of the engine 3 is controlled, followed by terminating the program.

Figure 3:
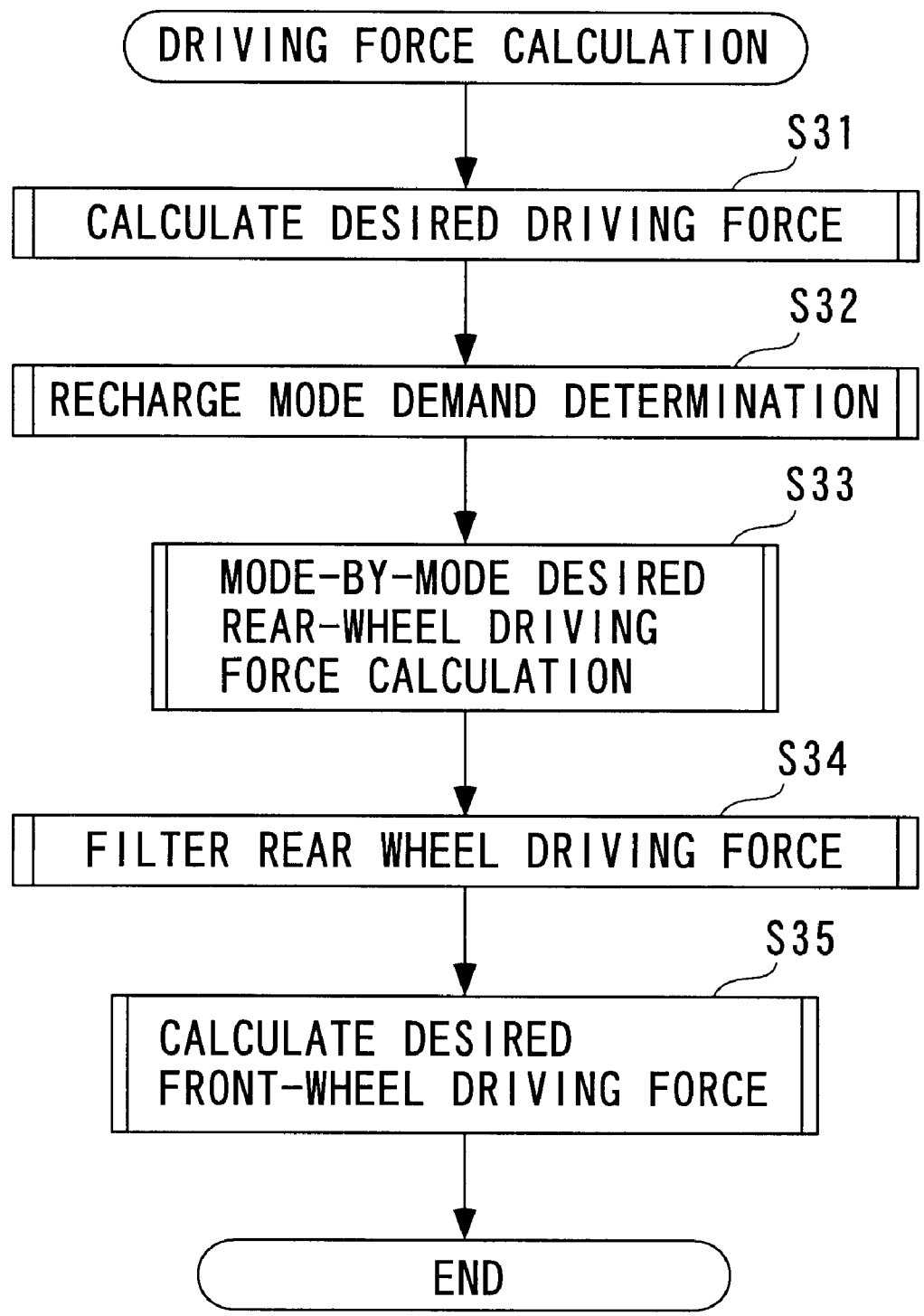
FIG. 3 is a flowchart of a subroutine for a driving force-calculating process.
Figure 4:
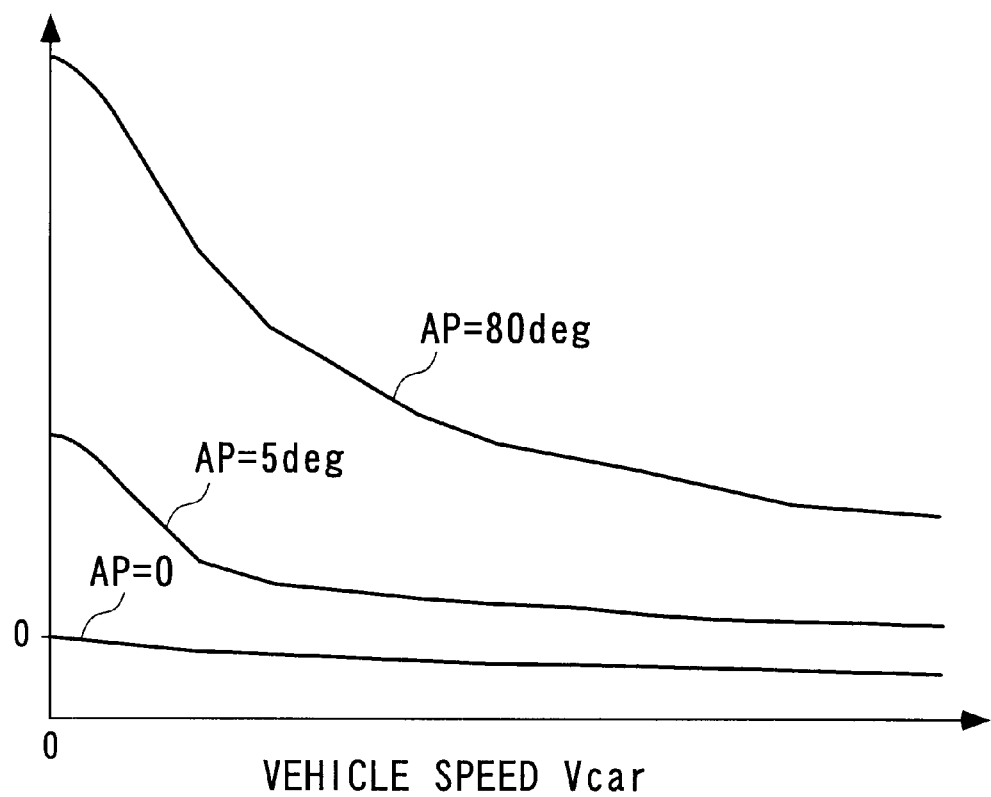
FIG. 4 is a diagram of an example of an FCMD table.

FIG. 3 shows a subroutine for carrying out the driving force-calculating process which is executed at the step S23 in FIG. 2. In this control process, first at a step S31, the desired driving force FCMD for the whole vehicle 2 is calculated according to the control mode determined at the step S22. This desired driving force FCMD is calculated by looking up a table an example of which is shown in FIG. 4, according to the detected vehicle speed Vcar and AP opening θAP. In FIG. 4, there are shown representative table values obtained, respectively, when the AP opening θAP is equal to 0 degrees, 5 degrees, and 80 degrees. The table is configured such that the desired driving force FCMD becomes larger with an increase in the AP opening θAP, and becomes smaller with an increase in the vehicle speed Vcar. It should be noted that a table value corresponding to the AP opening θAP of 0 degrees is representative of a line corresponding to the shift lever position of D4. In this case, the desired driving force FCMD is calculated as a negative value.

Then, a cruising-time recharge mode demand-determining process is executed at a step S32. More specifically, a reference driving force FCMD_CHRG is calculated based on the vehicle speed Vcar and the remaining charge SOC of the battery 7, and it is determined from the relationship between the reference driving force FCMD_CHRG and the desired driving force FCMD calculated at the step S31 whether or not the vehicle 2 is in a cruising condition under which the battery 7 is to be charged. If the answer to the question is affirmative (YES), the control mode is set to a cruising recharge mode (also referred to as the non-decelerating travel time recharge mode) to charge the battery 7. This process will be described in detail hereinafter.

At the following step S33, the desired rear-wheel driving force FCMD_MOT is calculated. This calculation is performed in a manner dependent on the control mode (according to one of the drive mode, the decelerating regeneration mode, the cruising recharge mode, and the stoppage mode) determined at the step S22 in FIG. 2 and the above step S32.

Then, after carrying out a predetermined filtering process on the desired rear-wheel driving force FCMD_MOT at a step S34, the desired front-wheel driving force FCMD_ENG is calculated by using the following equation (1):

$$FCMD\_ENG = FCMD - FCMD\_MOT - FCMD\_OFF \quad (1)$$

wherein FCMD_OFF represents engine drag torque (negative value), followed by terminating the program. As shown by the equation, the desired front-wheel driving force FCMD_ENG is basically set to a value obtained by subtracting the desired rear-wheel driving force FCMD_MOT from the desired driving force FCMD.

Figure 5:
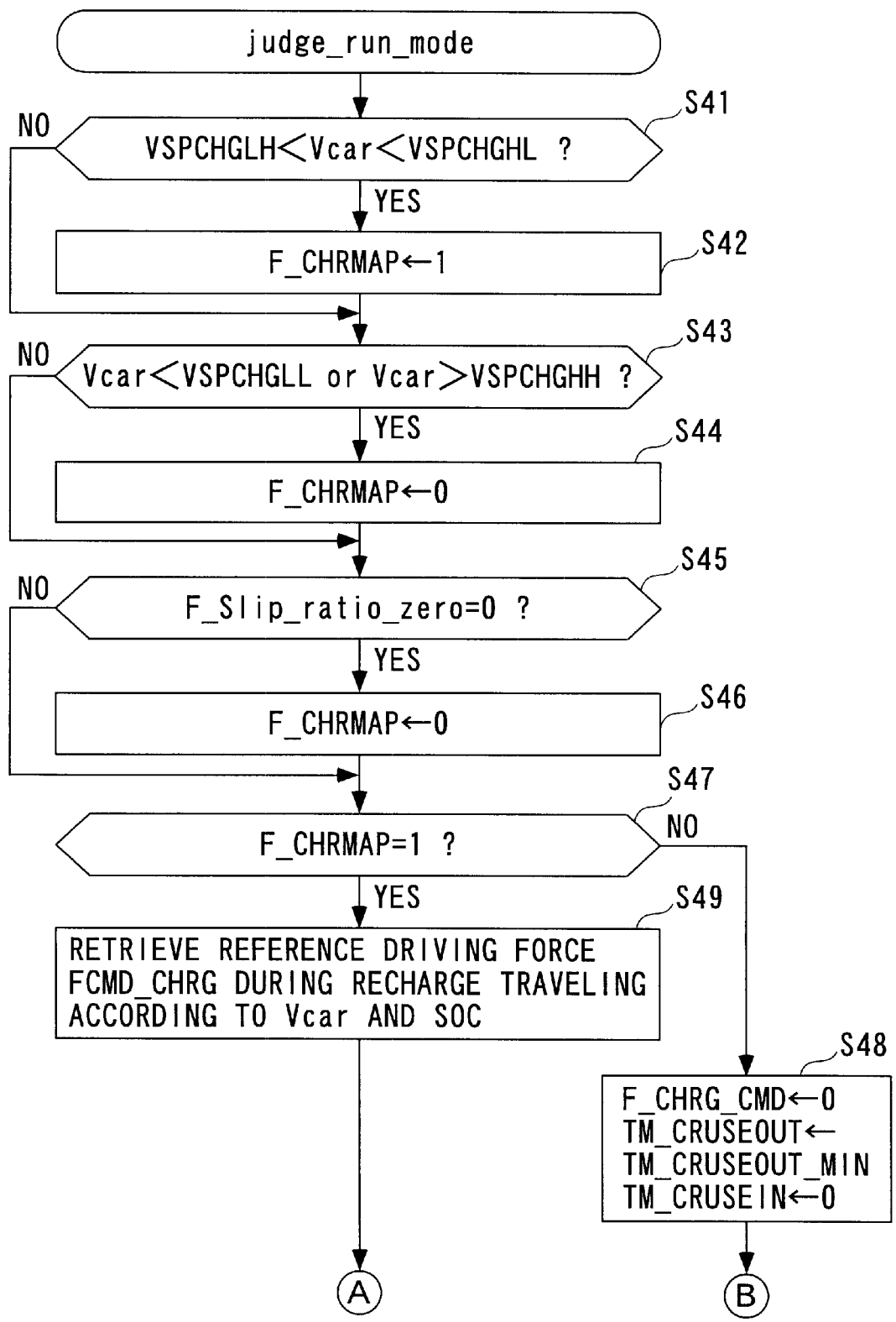
FIG. 5 is a flowchart of a subroutine for a cruising-time recharge mode demand-determining process.
Figure 6:
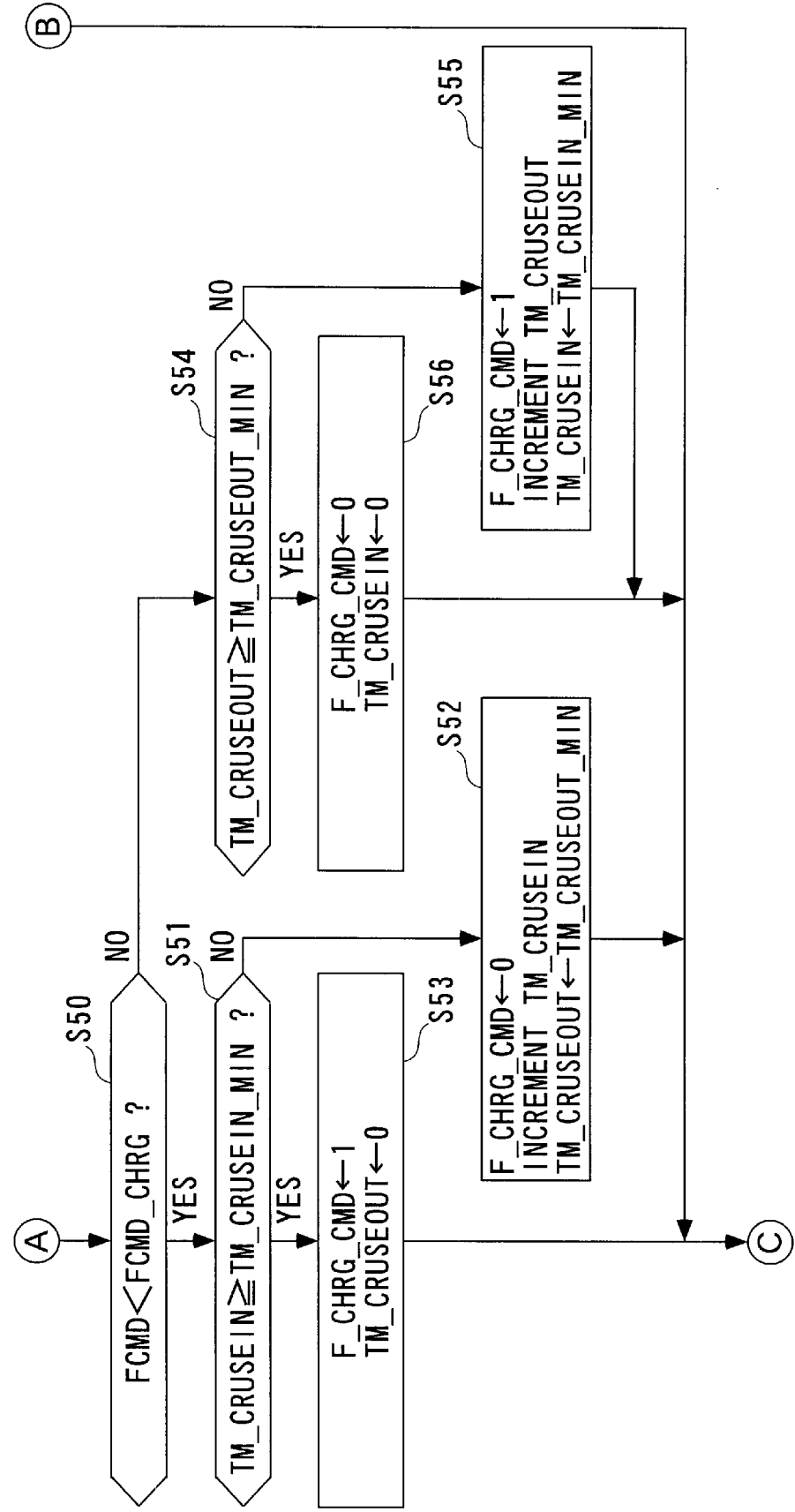
FIG. 6 is a continuation of the flowchart in FIG. 5.
Figure 7:
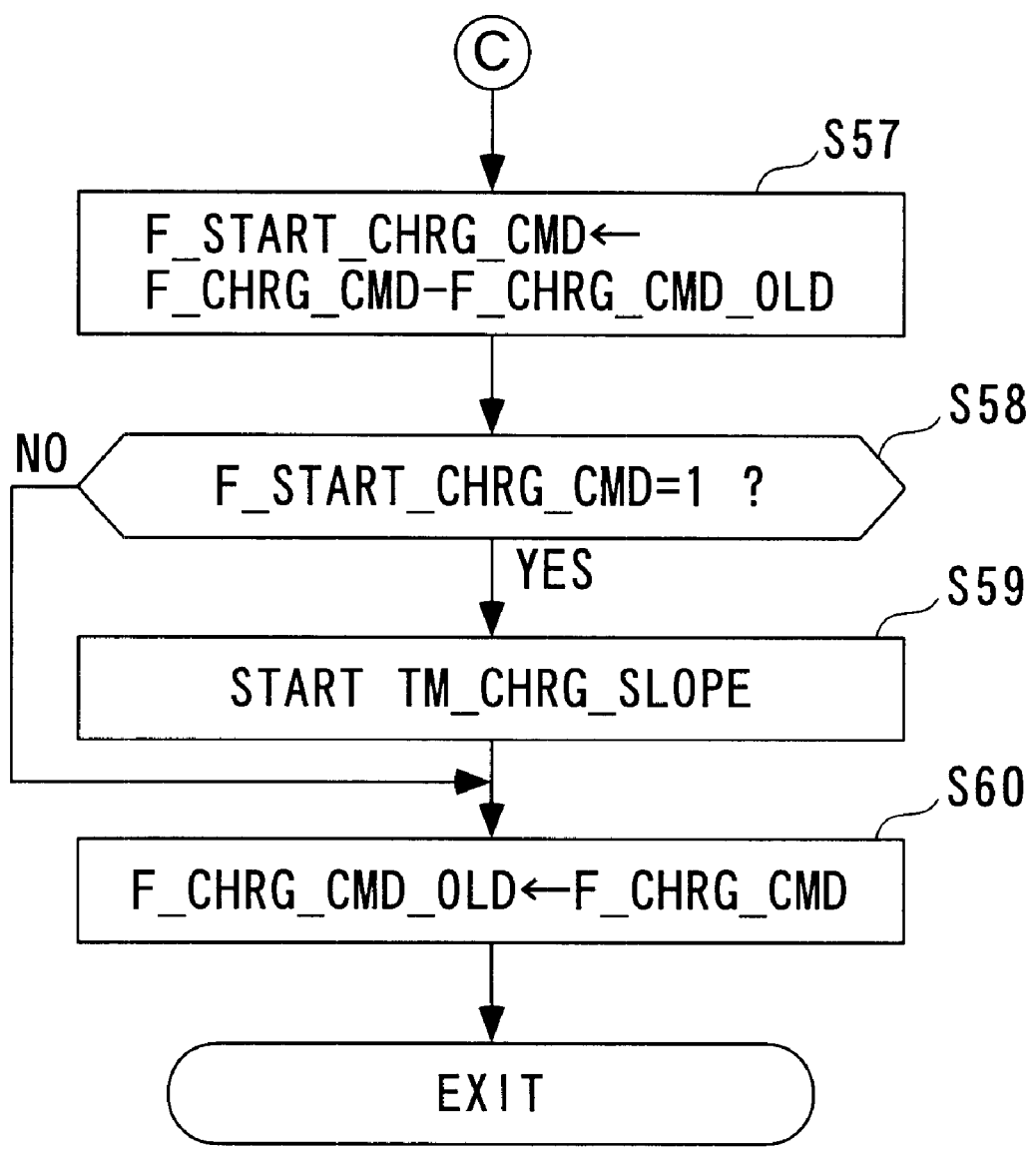
FIG. 7 is a continuation of the flowchart in FIGS. 5 and 6.

FIGS. 5 to 7 show a subroutine for carrying out the cruising-time recharge mode demand-determining process, which is executed at the step S32 in FIG. 3. In this control process, first, it is determined at a step S41 whether or not the vehicle speed Vcar is higher than a first lower limit value VSPCHGLH (e.g. 25 km/h) and lower than a first upper limit value VSPCHGHL (e.g. 65 km/h).

If the answer to the question is affirmative (YES), i.e. if VSPCHGLH<Vcar<VSPCHGHL holds, it is judged that the vehicle speed Vcar is within a predetermined range for recharge traveling, and a recharge traveling map lookup flag F_CHRMAP is set to "1" at a step S42. On the other hand, if the answer to the question of the step S41 is negative (NO), i.e. if Vcar≦VSPCHGLH or Vcar≧VSPCHGHL holds, it is judged that the vehicle speed Vcar is not within the predetermined range for recharge traveling, and the program skips the step S42 and directly proceeds to a step S43. The reason for skipping the step S42 is that during very low-speed driving e.g. in a traffic congestion where the vehicle speed Vcar is low, it is troublesome to start recharge traveling, and hence it is desirable to avoid this operation, while during high-speed driving where the vehicle speed Vcar is high, the motor 4 cannot rotate in accordance with high-speed rotation of the rear wheels WR, and hence the electromagnetic clutch 8 is disconnected from the motor 4. It should be noted that it is also possible to omit the electromagnetic clutch 8 and drive the rear wheels WR by using a large-sized motor. In this case, limitation on the vehicle speed Vcar by the above first upper limit value VSPCHGHL and a second upper limit value VSPCHGHH described below may be omitted.

At a step S43 following the step S41 or S42, it is determined whether or not the vehicle speed Vcar is lower than a second lower limit value VSPCHGLL (e.g. 20 km/h) or higher than the second upper limit value VSPCHGHH (e.g. 70 km/h). The second lower and upper values VSPCHGLL and VSPCHGHH are set by adding hystereses to the respective first lower and upper values VSPCHGLH and VSPCHGHL. Therefore, if the answer to the question of the step S43 is affirmative (YES), i.e. if Vcar<VSPCHGLL or Vcar>VSPCHGHH holds, it is judged that the vehicle speed Vcar is not within the predetermined range for recharge traveling, and the recharge traveling map lookup flag F_CHRMAP is set to "0" at a step S44. On the other hand, if the answer to the question is negative (NO), the program skips the step S44 and directly proceeds to the following step S45.

At the step S45, it is determined whether or not a rear-wheel slip ratio zero adjustment flag F_Slip_ratio_zero assumes "0". The flag F_Slip_ratio_zero is set to "1" upon completion of the zero adjustment of the rear-wheel slip ratio Slip_ratio, which is carried out at the start of the vehicle so as to correct the tire diameter difference, e.g. when the front wheels WF and the rear wheels WR have different tire diameters. Therefore, if the answer to the question of the step S45 is affirmative (YES), i.e. if F_Slip_ratio_zero=0 holds, the recharge traveling map lookup flag F CHRMAP is set to "0" at a step S46. On the other hand, if the answer is negative (NO), the program skips the step S46 and directly proceeds to the following step S47.

At the step S47, it is determined whether or not the recharge traveling map lookup flag F_CHRMAP assumes "1". If the answer to the question is negative (NO), i.e. if the vehicle speed Vcar is not within the predetermined range or if the zero adjustment of the rear-wheel slip ratio Slip_ratio has not been completed, it is judged that basic conditions for executing the recharge mode are not satisfied, and the program proceeds to a step S48. At the step S48, a recharge mode flag F_CHRG_CMD is set to "0" to inhibit execution of recharge traveling, the count of a cruise-out delay timer TM_CRUISEOUT, referred to hereinafter, is set to a predetermined time period TM_CRUISEOUT_MIN (e.g. 0.1 sec.), and the count of a cruise-in delay timer TM_CRUISEIN, also referred to hereinafter, is set to a value of 0, followed by the program proceeding to a step S57.

On the other hand, if the answer to the question of the step S47 is affirmative (YES), i.e. if the vehicle speed Vcar is within the predetermined range and if the zero adjustment of the rear-wheel slip ratio Slip_ratio has been completed, it is judged that the basic conditions for executing the cruising recharge mode are satisfied, and the program proceeds to a step S49, wherein a recharge traveling map is looked up or searched according to the vehicle speed Vcar and the remaining charge SOC of the battery 7, to thereby determine the reference driving force FCMD_CHRG.

Figure 8:
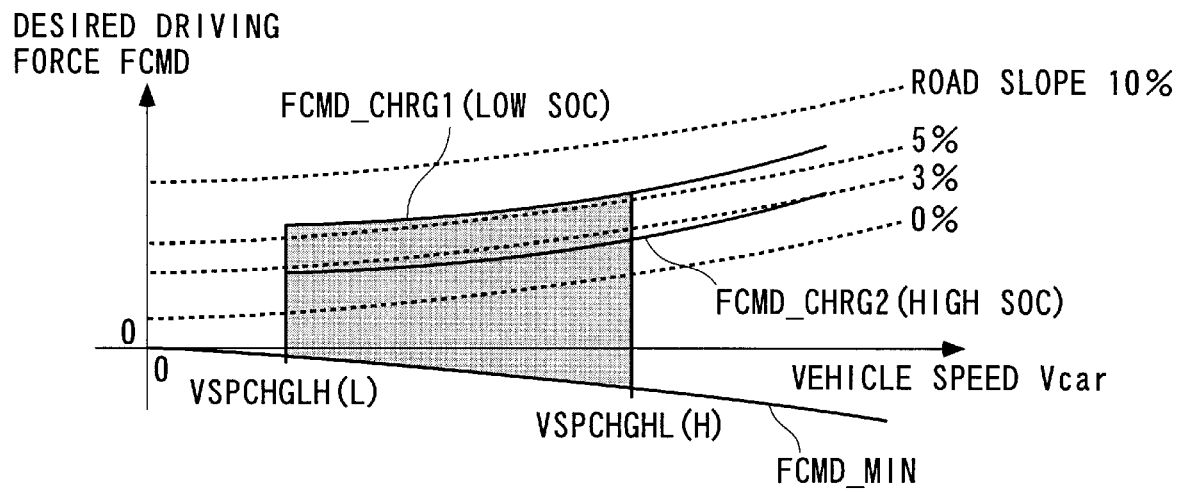
FIG. 8 is a diagram showing an example of a recharge traveling map.

FIG. 8 shows an example of the recharge traveling map. The recharge traveling map defines a region of the desired driving force FCMD within which the recharge traveling should be executed. As described in detail hereinafter, the recharge traveling is permitted when the driving force FCMD is smaller than the reference driving force FCMD_CHRG set in the recharge traveling map. In the FIG. 8 map, an FCMD_CHRG1 for a low SOC (e.g. 0 to 60%) and an FCMD_CHRG2 for a high SOC (e.g. 60 to 100%) are each set as a reference driving force FCMD_CHRG with respect to the vehicle speed within the predetermined range. One of the FCMD_CHRG1 and the FCMD_CHRG2 is selected depending on the SOC value.

Broken lines in the figure represent running resistance curves in the cruising of the vehicle on respective roads having different slopes. These running resistance curves are each theoretically determined by the formula of "air resistance coefficient×(vehicle speed Vcar)$^2$+rolling resistance coefficient×vehicle weight+road slope (%)×vehicle weight+ motor drag torque". As is apparent from FIG. 8, the low-SOC reference driving force FCMD_CHRG1 varies in a curve generally equal to a running resistance curve corresponding to a road slope of 5%, while the high-SOC reference driving force FCMD_CHRG2 varies in a curve generally equal to a running resistance curve corresponding to a road slope of 3%. Consequently, the reference driving forces FCMD_CHRG1, FCMD_CHRG2 are set such that they each increase progressively with an increase in the vehicle speed Vcar, and the low-SOC reference driving force FCMD_CHRG1 is higher than the high-SOC reference driving force FCMD_CHRG2. It should be noted that a lowermost line FCMD_MIN in the recharge traveling map represents the desired driving force FCMD set when the AP 17 is in its OFF state. That is, the line FCMD_MIN corresponds to a lowermost line of the desired driving force FCMD. As is apparent from the above description, areas between the respective reference driving forces FCMD_CHRG1 and FCMD_CHRG2 and the lowermost line FCMD_MIN of the desired driving force in the FIG. 8 recharge traveling map represent executing regions for executing the cruising recharge mode during a low SOC time and a high SOC time, respectively.

Then, at a step S50 in FIG. 6, it is determined whether or not the desired driving force FCMD calculated at the step S31 in FIG. 3 is smaller than the reference driving force FCMD_CHRG retrieved at the step S49. If the answer to the question is affirmative (YES), i.e. if FCMD<FCMD_CHRG holds and if the desired driving force FCMD is within a corresponding of the executing ranges in the FIG. 8 recharge traveling map, it is judged that recharge traveling conditions are satisfied, and the program proceeds to a step S51, wherein it is determined whether or not the count of the cruise-in delay timer TM_CRUISEIN is equal to or larger than its predetermined time period TM_CRUISEIN_MIN (e.g. 2 sec.). As described hereinbefore, when the basic conditions for executing the cruising recharge mode are not satisfied, the cruise-in delay timer TM_CRUISEIN is reset to 0 at the step S48, and hence the answer to the question is negative (NO) when the step S51 is first executed. In this case, the program proceeds to a step S52, wherein the recharge mode flag F_CHRG_CMD is held at "0" so as to inhibit execution of recharge traveling, and at the same time the count of the cruise-in delay timer TM_CRUISEIN is incremented, with the count of the cruise-out delay timer TM_CRUISEOUT held at the predetermined time period TM_CRUISEOUT_MIN, followed by the program proceeding to the step S57 which will be described in detail hereinafter.

If the answer to the question of the step S51 is affirmative (YES), i.e. if the predetermined time period TM_CRUISEIN_MIN has elapsed after the conditions for recharge traveling were satisfied, the recharge mode flag F_CHRG_CMD is set to "1" so as to start recharge traveling, and at the same time the count of the cruise-out delay timer TM_CRUISEOUT is reset to "0" at a step S53, followed by the program proceeding to the step S57. As described above, recharge traveling is executed when the desired driving force FCMD is smaller than the reference driving force FCMD_CHRG and at the same time this state has been maintained over the predetermined time period TM_CRUISEIN_MIN.

On the other hand, if the answer to the question of the step S50 is negative (NO), i.e. if FCMD≧FCMD_CHRG holds, which means that the desired driving force FCMD is not within the executing range in the FIG. 8 recharge traveling map, it is determined at a step S54 whether or not the count of the cruise-out delay timer TM_CRUISEOUT is equal to or larger than the predetermined time period TM_CRUISEOUT_MIN. The count of the cruise-out delay timer TM_CRUISEOUT was reset to "0" at the step S53, and hence when the present loop is being executed immediately after the start of the recharge mode, the answer to the question of the step S54 is negative (NO). In this case, the program proceeds to a step S55, wherein the recharge traveling is continued with the recharge mode flag F_CHRG_CMD held at "1". Further, the count of the cruise-out delay timer TM_CRUISEOUT is incremented, with the count of the cruise-in delay timer TM_CRUISEIN held at the predetermined time period TM_CRUISEIN_MIN, followed by the program proceeding to the step S57.

If the answer to the question of the step S54 is affirmative (YES), i.e. if the predetermined time period TM_CRUISEOUT_MIN has elapsed after the desired driving force FCMD became equal to or larger than the reference driving force FCMD_CHRG, the recharge mode flag F_CHRG_CMD is set to "0" so as to terminate the recharge traveling, and the count of the cruise-in delay timer TM_CRUISEIN is reset to 0 at a step S56, followed by the program proceeding to the step S57. As described above, recharge traveling is terminated when the desired driving force FCMD exceeds the reference driving force FCMD_CHRG and further this state is maintained over the predetermined time period TM_CRUISEOUT_MIN. This prevents occurrence of control hunting between execution of the cruising recharge mode and inhibition of the same.

Then, at the step S57 after execution of the step S48, S52, S53, S55 or S56, a difference between the present value of the recharge mode flag F_CHRG_CMD and the immediately preceding value F_CHRG_CMD_OLD of the same is calculated as a recharge traveling start flag F_START_CHRG_CMD, and at the following step S58, it is determined whether or not the value of the recharge traveling start flag F_START_CHRG_CMD is equal to "1". If the answer to the question is affirmative (YES), i.e. if F_START_CHRG_CMD=1 holds which means that the present loop is a first one that has started the recharge traveling, a charging slope control timer TM_CHRG_SLOPE is incremented for starting the same at a step S59. On the other hand, if the answer to the question of the step S58 is negative (NO), i.e. if the present loop is not the first one that has started the recharge traveling, the program skips the step S59 and directly proceeds to a step S60. At the step S60, the present recharge mode flag value F_CHRG_CMD is set to the immediately preceding value F_CHRG_CMD_OLD, followed by terminating the program.

As described above, according to the above control process, when the actual desired driving force FCMD of the vehicle 2 is determined to be smaller than the reference driving force FCMD_CHRG set in the FIG. 8 recharge traveling map, the execution of the cruising recharge mode is permitted, and recharge traveling is performed. Further, as described hereinbefore, the reference driving forces FCMD_CHRG1, FCMD_CHRG2 are equal to the respective driving forces of the vehicle 2 required for cruising on roads having respective slopes of 3% and 5%. Therefore, in a state of cruising being performed on a road having a smaller slope than the road slope of 3% or 5%, when the desired driving force FCMD of the vehicle 2 becomes smaller than the reference driving force FCMD_CHRG, the recharge traveling is started. In this case, since the vehicle 2 is in a cruising condition and the desired driving force FCMD for the whole vehicle 2 is small, an increase in load on the engine 3 due to execution of recharge traveling is limited. On the other hand, e.g. during acceleration of the vehicle 2 in which the AP 17 is being stepped on, the desired driving force FCMD increases to exceed the reference driving force FCMD_CHRG, and hence recharge traveling is inhibited. Thus, recharge traveling can be performed without applying extra load on the engine 3, exclusively when there is no demand by the driver for acceleration, so that it is possible to improve fuel economy and drivability of the vehicle.

Further, since the reference driving force FCMD_CHRG is set as above, it is possible to secure a recharge traveling range during cruising to thereby charge the battery 7 reliably as well as to easily calculate the reference driving force FCMD_CHRG by using the theoretical formula. Moreover, since the reference driving force FCMD_CHRG can be referred to not only for determination as to whether or not the vehicle 2 is in the cruising condition suitable for charge of the battery, but also for execution of recharge traveling, it is possible to perform determination as to the cruising condition and execution of recharge traveling, easily and properly, simply by presetting the reference driving force FCMD_CHRG and storing the same in the recharge traveling map.

Furthermore, the larger reference driving force FCMD_CHRG1 is employed as a reference driving force FCMD_CHRG during the low SOC-time operation, while the lower reference driving force FCMD_CHRG2 is employed during the high SOC-time operation, so that in the low-SOC state where the demand for recharge of the battery is high, it is possible to start the recharge mode readily even during a cruising performed on a road with a larger slope, and hence carry out effective and proper charging of the battery 7 according to the degree of demand.

Figure 9:
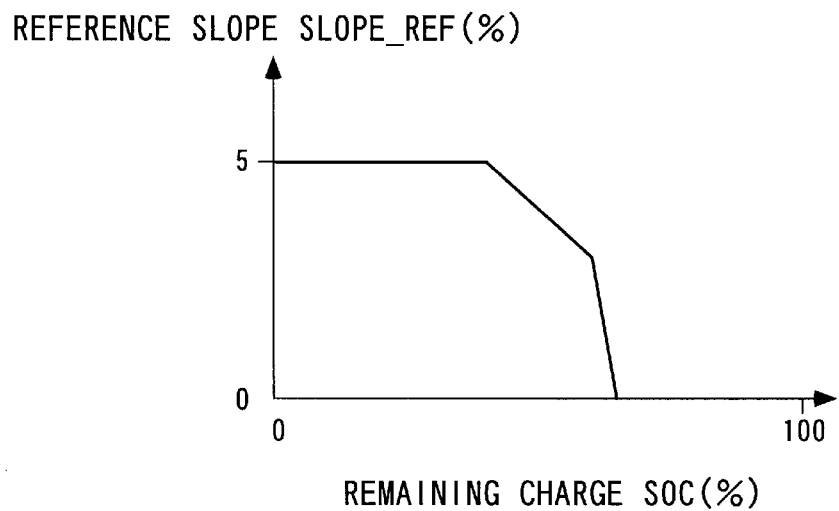
FIG. 9 is a diagram showing an example of a remaining charge-reference slope table.

Although in the above recharge traveling map, one of the two reference driving forces FCMD_CHRG1, FCMD_CHRG1 for the low SOC and the high SOC, each preset as a reference driving force FCMD, is selected according to the actual remaining charge SOC, this is not limitative but the correction of the reference driving force FCMD may be carried out according to the remaining charge SOC by another method. FIG. 9 shows an example of a table for use in this method. The table is set such that a reference slope SLOPE_REF increases as the remaining charge SOC decreases. In the method, the table is looked up to retrieve a table value of the reference slope SLOPE_REF corresponding to the actual remaining charge SOC, and a running resistance curve of the vehicle 2 which would be exhibited when the vehicle is running on a road having the retrieved reference slope SLOPE_REF is set as a reference driving force FCMD_CHRG at the time point. Thus, the reference driving force FCMD_CHRG can be set more finely according to the remaining charge SOC, which makes it possible to charge the battery 7 more properly according to the degree of demand for recharge of the battery.

Figure 10:
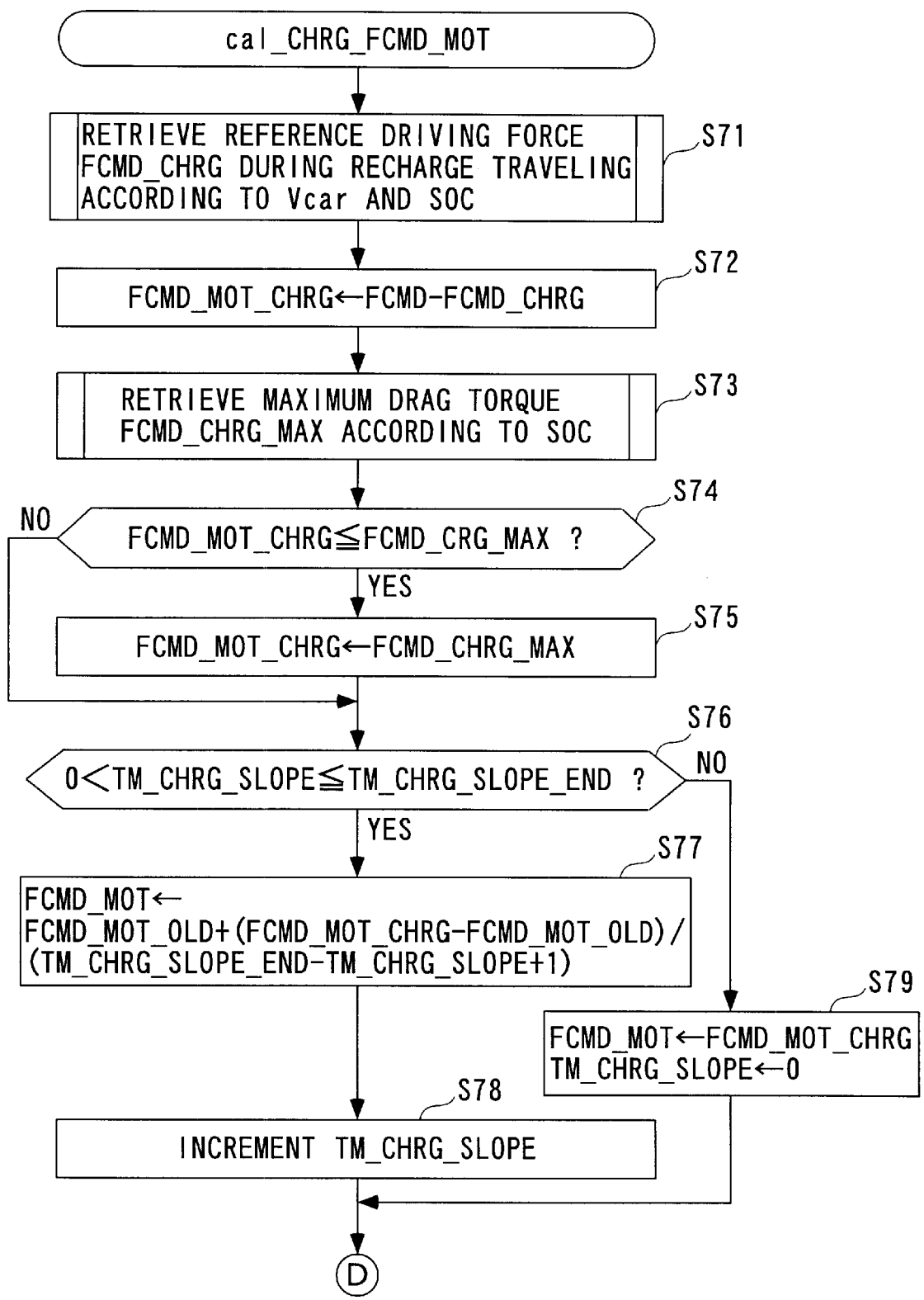
FIG. 10 is a flowchart of a subroutine for calculating a desired rear-wheel driving force in a cruising recharge mode.
Figure 11:
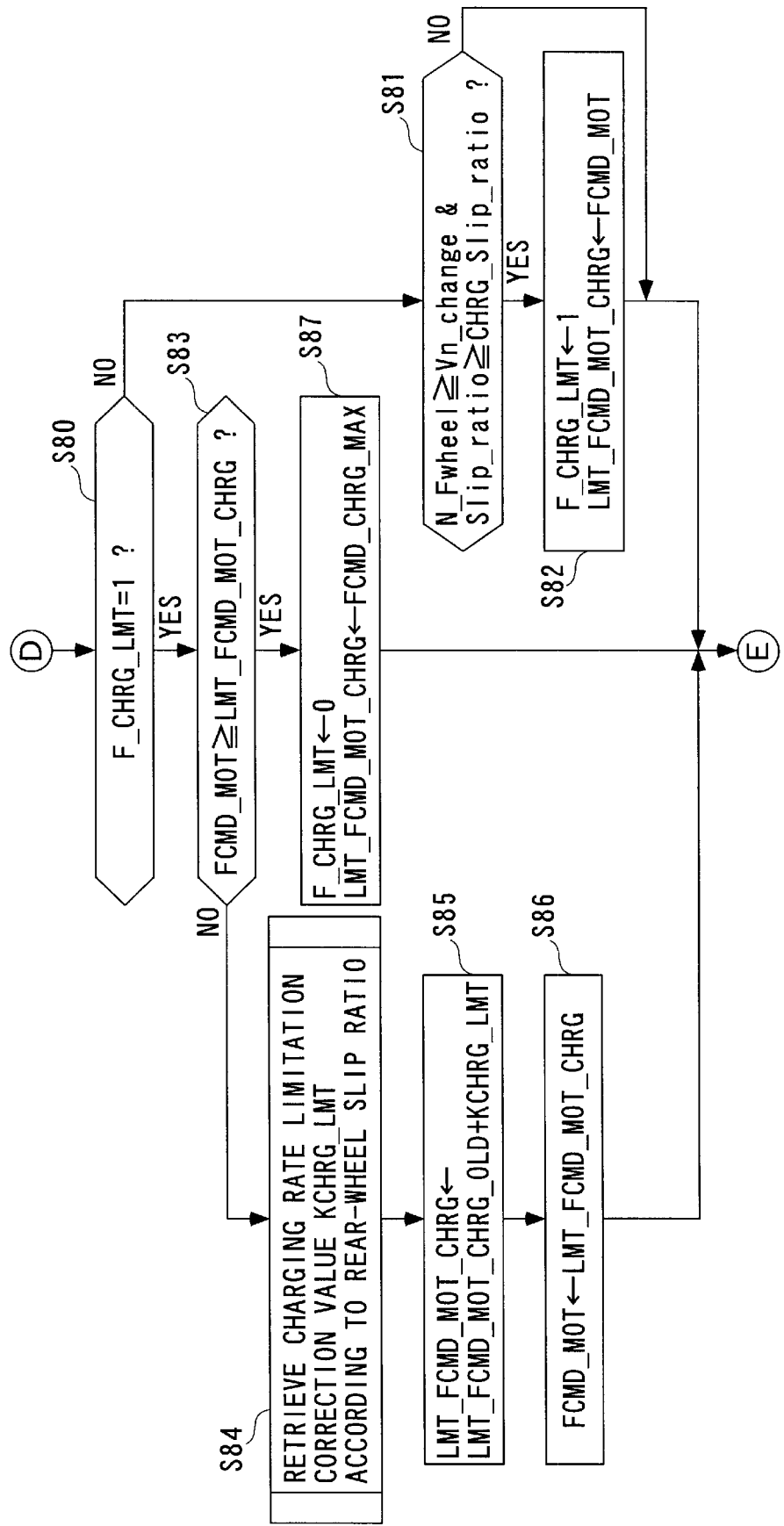
FIG. 11 is a continuation of the flowchart in FIG. 10.
Figure 12:
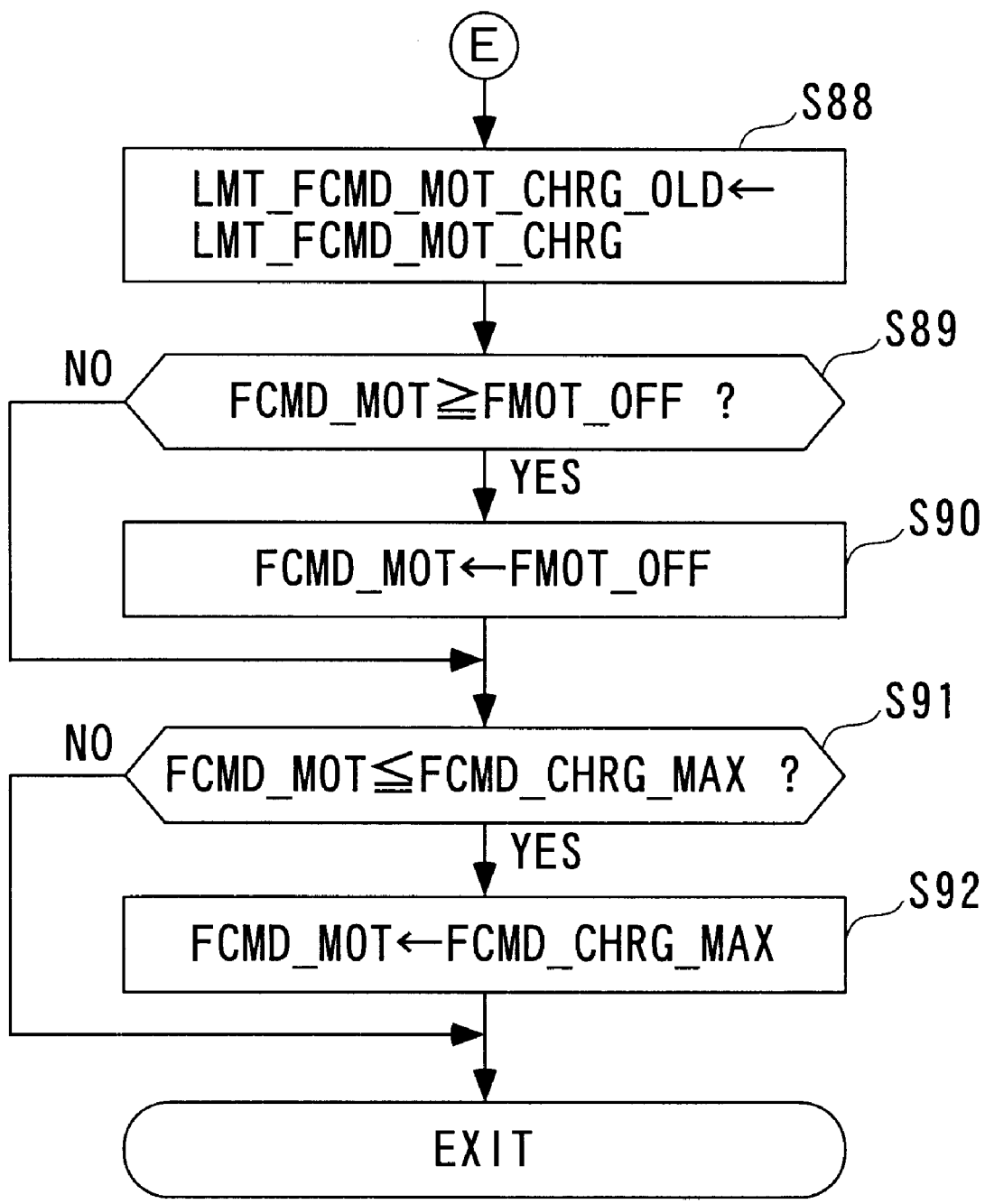
FIG. 12 is a continuation of the flowchart in FIGS. 10 and 11.

FIGS. 10 to 12 show a subroutine for carrying out calculation of the desired rear-wheel driving force FCMD_MOT in the cruising recharge mode executed according to the result of the determination made in the subroutine shown in FIGS. 5 to 7. In the present control process, first, the FIG. 8 recharge traveling map is looked up at a step S71, similarly to the step S49 in FIG. 5, to retrieve a reference driving force FCMD_CHRG based on the vehicle speed Vcar and the remaining charge SOC. Then, at a step S72, a desired calculated value FCMD_MOT_CHRG of the rear-wheel driving force during recharge is calculated from the retrieved reference driving force FCMD_CHRG and the desired driving force FCMD, by using the following equation (2):

$$FCMD\_MOT\_CHRG = FCMD - FCMD\_CHRG \qquad (2)$$

As is apparent from the above equation, the desired calculated value FCMD_MOT_CHRG of the rear-wheel driving force during recharge is determined as a difference between the desired driving force FCMD and the retrieved reference driving force FCMD_CHRG. Further, since the cruising recharge mode is executed, as described above, when FCMD<FCMD_CHRG holds, the desired calculated value FCMD_MOT_CHRG of the rear-wheel driving force during recharge is calculated as a negative value, which is set as a drag torque of the rear wheels WR. Further, as mentioned in the description of the step S35, the desired front-wheel driving force FCMD_ENG is basically set as a value obtained by subtracting the desired rear-wheel driving force FCMD_MOT from the desired driving force FCMD (FCMD_ENG=FCMD−FCMD MOT), and hence in the cruising recharge mode, the value FCMD_MOT_CHRG is added to the desired front-wheel driving force FCMD_ENG.

As described above, the desired rear-wheel driving force FCMD_MOT in the cruising recharge mode is basically set according to the difference between the desired driving force FCMD and the reference driving force FCMD_CHRG. Therefore, even if the desired rear-wheel driving force FCMD_MOT is very small, it is possible to start or terminate recharge traveling. As a result, sudden generation and loss of the desired rear-wheel driving force FCMD_MOT can be prevented, which enables recharge traveling to be performed without giving any uncomfortable feeling to the driver.

Figure 13:
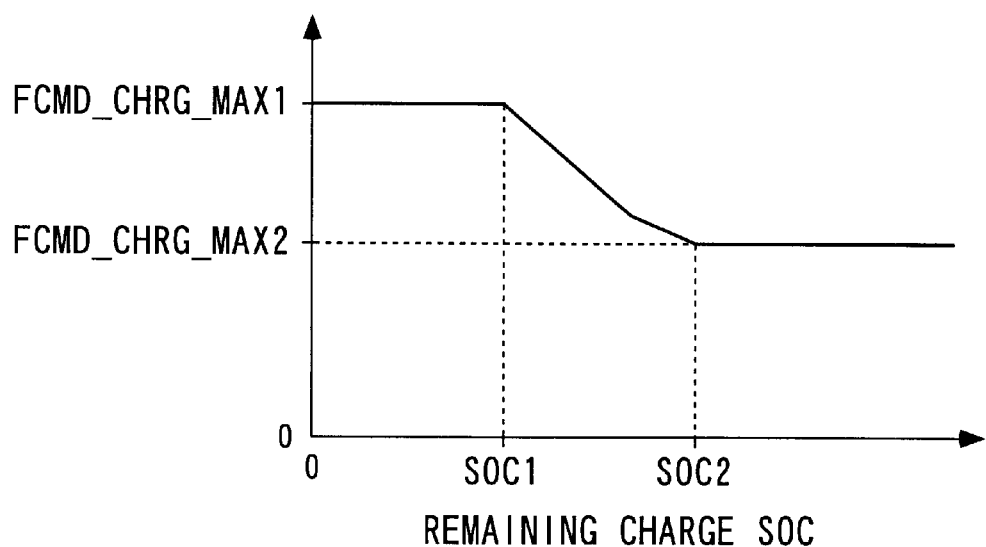
FIG. 13 is a diagram showing an example of a maximum drag torque amount table.

Then, the desired calculated value FCMD_MOT_CHRG of the rear-wheel driving force during recharge is subjected to a limiting process. In this process, first at a step S73, a maximum drag torque FCMD_CHRG_MAX of the rear wheels WR is retrieved according to the remaining charge SOC. FIG. 13 shows an example of a maximum drag torque table. In the table, the maximum drag torque FCMD_CHRG_MAX is basically set to a larger value as the remaining charge SOC is smaller, so as to increase the charging rate at which the battery is charged with the running energy. More specifically, when the SOC value is equal to or smaller than a first predetermined value SOC1 (e.g. 30%), the maximum drag torque FCMD_CHRG_MAX is set to a first reference value FCMD_CHRG_MAX1 (e.g. −60 kgf), while when the SOC value is equal to or larger than a second predetermined value SOC2 (e.g. 60%) larger than the first predetermined value SOC1, the maximum drag torque FCMD_CHRG_MAX is set to a second reference value FCMD_CHRG_MAX2 (e.g. −35 kgf) smaller than the first reference value FCMD_CHRG_MAX1. The maximum drag torque FCMD_CHRG_MAX progressively decreases between the two predetermined values SOC1, SOC2.

Then, it is determined at a step S74 whether or not the calculated value FCMD_MOT_CHRG (negative value) of the desired rear-wheel driving force during recharge is equal to or smaller (i.e. larger as an absolute value) than the maximum drag torque FCMD_CHRG_MAX. If the answer to the question is affirmative (YES), the value FCMD_MOT_CHRG is set to the maximum drag torque FCMD_CHRG_MAX at a step S75, whereas if the answer is negative (NO), the step S75 is skipped, and the present value FCMD_MOT_CHRG is maintained.

At a step S76 following the step S74 or S75, it is determined whether or not the count of the charging slope control timer TM_CHRG_SLOPE is larger than 0 and equal to or smaller than a value corresponding to a predetermined time period TM_CHRG_SLOPE_END thereof (e.g. 1.5 sec.). If the answer to the question is affirmative (YES), i.e. if the predetermined time period TM_CHRG_SLOPE_END has not elapsed after the start of recharge traveling, the calculation of the desired rear-wheel driving force FCMD_MOT is carried out at a step S77 so as to progressively shift the same from a value adapted to a state of the engine before the start of the recharge traveling to a value adapted to a drag torque of the engine during the recharge traveling in a sloping manner by using the following equation (3):

FCMD_MOT=FCMD_MOT_OLD+(FCMD_MOT_CHRG−FCMD_MOT_OLD/(TM_CHRG_SLOPE_END−TM_CHRG_SLOPE+1)  (3)

and then the count of the charging slope control timer TM_CHRG_SLOPE is incremented at a step S78. In the above equation, FCMD_MOT_OLD represents the immediately preceding value of the desired rear-wheel driving force, and the denominator (TM CHRG_SLOPE_END−TM_CHRG_SLOPE+1) in the right side represents a remaining operation time period (remaining numbers of slope calculation) of the charging slope control timer TM_CHRG_SLOPE. More specifically, a value obtained by dividing the difference between the present desired calculated value FCMD_MOT_CHRG of the rear-wheel driving force during recharge and the immediately preceding value FCMD_MOT_OLD of the same by the remaining operation time period is added to the FCMD_MOT_OLD value in each loop during the remaining operation time period of the timer, whereby the desired rear-wheel driving force FCMD_MOT is progressively changed or increased in a sloping manner and thereby finally caused to reach the desired calculated value FCMD_MOT_CHRG of the rear-wheel driving force during recharge after the lapse of the predetermined time period TM_CHRG_SLOPE_END. Thus, the desired rear-wheel driving force FCMD_MOT can be progressively shifted from the value adapted to the state of the engine before the start of recharge traveling to the drag torque of the engine during the charging time in the sloping manner.

On the other hand, if the answer to the question of the step S76 is negative (NO), i.e. if the predetermined time period TM_CHRG_SLOPE_END has elapsed after the start of recharge traveling, at a step S79, the desired calculated value FCMD_MOT_CHRG of the rear-wheel driving force during recharge is directly set to the desired rear-wheel driving force FCMD_MOT, and at the same time the charging slope control timer TM_CHRG_SLOPE is reset to "0", followed by the program proceeding to steps S80 et seq.

Figure 16:
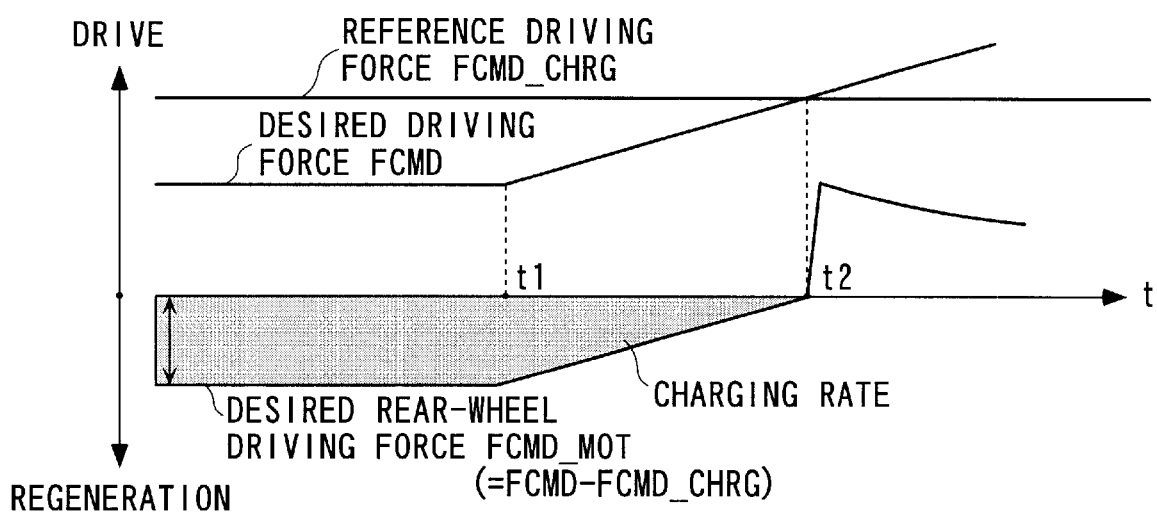
FIG. 16 is a timing chart showing an example of operation during and after execution of cruising.

FIG. 16 is a timing chart showing an example of operation during and after execution of cruising of the vehicle, which is achieved by the control process described above. First, assuming that the vehicle is cruising on a road having a low slope, the desired driving force FCMD is held below the reference driving force FCMD_CHRG. As a result, the answer to the question of the step S50 in FIG. 6 becomes affirmative (YES), so that the recharge traveling is started. The desired rear-wheel driving force FCMD_MOT or the charging rate at this time point is basically determined as a difference between the desired driving force FCMD and the reference driving force FCMD_CHRG (FCMD_MOT=FCMD−FCMD_CHRG) e.g. by using the equation (2). Thereafter, e.g. when the road slope progressively increases, the desired driving force FCMD is also progressively increased, and with the increase in the desired driving force FCMD, the difference between the desired driving force FCMD and the reference driving force FCMD_CHRG decreases, whereby the desired rear-wheel driving force FCMD_MOT is progressively reduced (between time t1 and time t2). Then, at a time point (time t2) when the desired driving force FCMD has reached the reference driving force FCMD_CHRG, the answer to the question of the step S50 becomes negative (NO), and hence the cruising recharge mode is terminated. At this time point, the desired rear-wheel driving force FCMD_MOT or the charging rate is approximately equal to 0. From this state, the control mode is shifted e.g. to the driving mode.

As described above, in the present embodiment, the desired rear-wheel driving force FCMD_MOT in the cruising recharge mode is set according to the difference between the desired driving force FCMD and the reference driving force FCMD_CHRG, so that it is possible to start and terminate recharge traveling in a state of the desired rear-wheel driving force FCMD_MOT being very small. As a result, sudden generation and loss of the desired rear-wheel driving force FCMD_MOT can be prevented, which enables recharge traveling to be performed without giving any uncomfortable feeling to the driver.

Referring to FIG. 11, at the steps S80 et seq., control for limiting the charging rate is executed so as to reduce slippage of the rear wheels due to the recharge traveling, thereby ensuring traveling stability of the vehicle 2. First, it is determined at the step S80 whether or not a charging rate limitation flag F_CHRG_LMT assumes "1". If the answer to the question is negative (NO), i.e. if the charging rate is not being limited, it is determined at a step S81 whether or not an average value N_Fwheel of left and right front-wheel rotational speeds is equal to or higher than a changeover rotational speed Vn_change (equivalent e.g. to a vehicle speed of 5 km/h), and the rear-wheel slip ratio Slip_ratio is equal to or larger than its reference value (e.g. 1%). In this case, since the vehicle 2 is in the cruising condition where the vehicle 2 is almost neither accelerated nor decelerated, the rear-wheel slip ratio Slip_ratio is defined as a simplified rear-wheel slip ratio calculated by using an equation: Slip_ratio=(N_Fwheel−N_Rwheel)/N_Fwheel, which utilizes the average value N_Fwheel of left and right front-wheel rotational speeds and an average value N_Rwheel of left and right rear-wheel rotational speeds. According to this definition, the rear-wheel slip ratio Slip_ratio is proportional to the difference in speed between the front wheels WF and the rear wheels WR.

If the answer to the question of the step S81 is affirmative (YES), i.e. if N_Fwheel≧Vn_change and Slip_ratio≧CHRG_Slip_ratio hold, it is judged that the rear wheel slippage is large and hence limitation on the charging rate should be started, so that at a step S82, the charging rate limitation flag F_CHRG_LMT is set to "1", and the desired rear-wheel driving force FCMD_MOT at the time point is set as an initial value of a charging rate limit value LMT_FCMD_MOT_CHRG, followed by the program proceeding to a step S88, which will be described hereinafter. If the answer to the question of the step S81 is negative (NO), the program immediately proceeds to the step S88.

On the other hand, if the answer to the question of the step S80 is affirmative (YES), i.e. if the charging rate limitation flag F_CHRG_LMT assumes "1", which means that the charging rate is being limited, it is determined at a step S83 whether or not the present desired rear-wheel driving force FCMD_MOT (negative value) calculated at the step S77 or S79 is equal to or larger (smaller as an absolute value) than the charging rate limit value LMT_FCMD_MOT_CHRG. If the answer to the question is negative (NO), i.e. if FCMD_MOT<LMT_FCMD_MOT_CHRG holds, which means that rear wheel drag torque is large, it is judged that limitation on the charging rate should be continued, and the program proceeds to a step S84, wherein a charging rate limitation correction value KCHRG_LMT is retrieved according to the rear-wheel slip ratio Slip_ratio.

Figure 14:
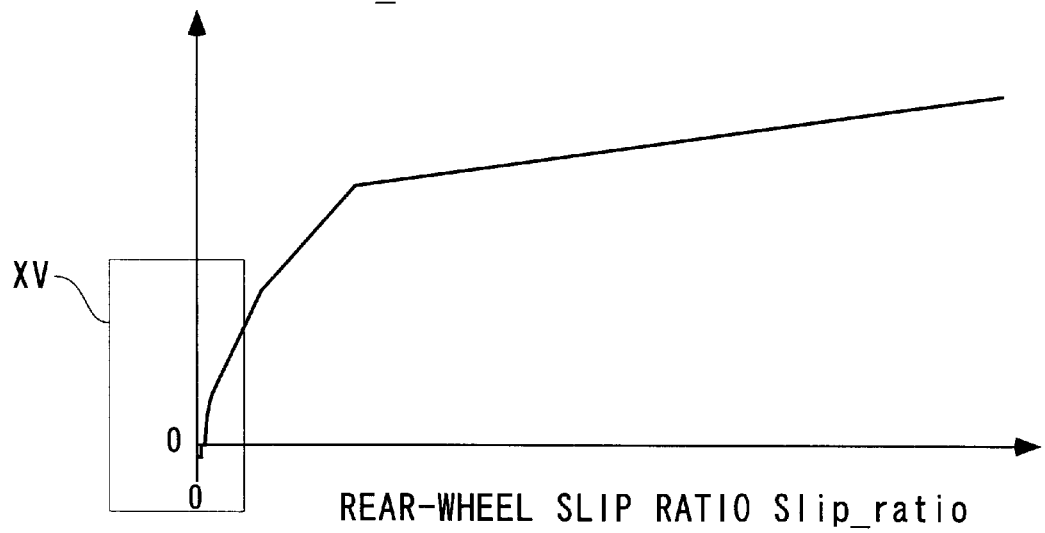
FIG. 14 is a diagram showing an example of a charging rate-limiting correction value table for use in the cruising recharge mode.

FIGS. 14 and 15 show an example of a charging rate limitation correction value table. In this table, the charging rate limitation correction value KCHRG_LMT is set to 0 within a range of the rear-wheel slip ratio Slip_ratio close to the reference value CHRG_Slip_ratio for use in determining when to start limitation on the charging rate. Further, in a range where the rear-wheel slip ratio Slip_ratio is larger than the reference value CHRG_Slip_ratio, the charging rate limitation correction value KCHRG_LMT increases stepwise, while in a range where the rear-wheel slip ratio Slip_ratio is equal to or smaller than a predetermined value Slip_ratio1 which is smaller than the reference value CHRG_Slip_ratio, the charging rate limitation correction value KCHRG_LMT is held at a fixed negative value KCHRG_LMT1. By setting the correction value KCHRG_LMT such that it increases stepwise, it is possible to prevent the correction value KCHRG_LMT from undergoing too sensitive changes in response to changes in the rear-wheel slip ratio Slip_ratio.

Then, at a step S85, the present charging rate limit value LMT_FCMD_MOT_CHRG is set to a value obtained by adding the charging rate limitation correction value CHRG_LMT to the immediately preceding value LMT_FCMD_MOT_CHRG_OLD of the charging rate limit value. At the following step S86, the desired rear-wheel driving force FCMD_MOT is set to the present charging rate limit value LMT_FCMD_MOT_CHRG, followed by the program proceeding to a step S88.

On the other hand, if the answer to the question of the step S83 is affirmative (YES), i.e. if FCMD MOT >LMT_FCMD_MOT_CHRG holds, it is judged that limitation on the charging rate should be lifted, so that the program proceeds to a step S87. At the step S87, the charging rate limitation flag F_CHRG_LMT is set to "0", and at the same time the charging rate limit value LMT_FCMD_MOT_CHRG is set to the maximum drag torque FCMD_CHRG_MAX retrieved at the step S73, followed by the program proceeding to the step S88.

At the step S88, the present charging rate limit value LMT_FCMD_MOT_CHRG is set to the immediately preceding value LMT_FCMD_MOT_CHRG_OLD thereof.

As described above, in the cruising recharge mode, when the rear-wheel slip ratio Slip_ratio becomes equal to or larger than the reference value CHRG Slip_ratio (YES to S81), limitation on the charging rate is started. Further, as long as the desired rear-wheel driving force FCMD_MOT is smaller than the charging rate limit value LMT_FCMD_MOT_CHRG (NO to S83), which means the rear wheel drag torque is larger than the LMT_FCMD_MOT_CHRG value, the desired rear-wheel driving force FCMD_MOT is limited to the charging rate limit value LMT_FCMD_MOT_CHRG corrected by the charging rate limitation correction value KCHRG_LMT (S85, S86). In this case, the charging rate limitation correction value KCHRG_LMT is added to the immediately preceding value LMT_FCMD_MOT_CHRG_OLD of the charging rate limit value (S85) which is a negative value and at the same time set in dependence on the rear-wheel slip ratio Slip_ratio according to the table in FIGS. 14 and 15 as described above.

Therefore, during execution of limitation on the charging rate, as long as the rear-wheel slip ratio Slip_ratio remains close to the reference value CHRG_Slip_ratio, the charging rate limitation correction value KCHRG_LMT is held at 0, whereby the desired rear-wheel driving force FCMD_MOT, i.e. the rear wheel drag torque (charging rate), is maintained without being corrected. Further, in the range where rear-wheel slip ratio Slip_ratio is larger than the reference value CHRG_Slip_ratio, the charging rate limitation correction value KCHRG_LMT is set to a larger positive value as the Slip_ratio value increases, whereby the rear wheel drag torque is reduced by a larger degree, so that the charging rate is limited to an increased extent. On the other hand, in the range where the rear-wheel slip ratio Slip_ratio is equal to or smaller than the predetermined value Slip_ratio1, the charging rate limitation correction value KCHRG_LMT is set to the negative value KCHRG_LMT1, whereby the rear wheel drag torque is increased to alleviate the limitation on the charging rate. As described above, during execution of the limitation on the charging rate, the desired rear-wheel driving force FCMD_MOT is limited according to the rear-wheel slip ratio Slip_ratio, so that it is possible to control the rear wheel drag torque more properly depending on the actual frictional resistance of the road surface on which the vehicle is running, thereby ensuring more excellent traveling stability.

Then, at step S89 et seq., the desired rear-wheel driving force FCMD_MOT set at the step S77, S79 or S86 is subjected to final limit processing. First, it is determined at the step S89 whether or not the desired rear-wheel driving force FCMD_MOT is equal to or larger than a motor drag torque FMOT_OFF as a resistance of the motor 4 to rotation. If the answer to the question is affirmative (YES), i.e. if FCMD_MOT≧FMOT_OFF holds, the desired rear-wheel driving force FCMD_MOT is set to the motor drag torque FMOT_OFF at a step S90 so as to ensure that the rear wheels WR can rotate the motor 4, whereas if the answer is negative (NO), the step S90 is skipped to thereby maintain the desired rear-wheel driving force FCMD_MOT.

Then, at a step S91, it is determined whether or not the desired rear-wheel driving force FCMD_MOT is equal to or smaller than the maximum drag torque FCMD_CHRG_MAX. If the answer to the question is affirmative (YES), i.e. if FCMD_MOT≦FCMD_CHRG_MAX holds, the desired rear-wheel driving force FCMD_MOT is set to the maximum drag torque FCMD_CHRG_MAX at a step S92, whereas if the answer is negative (NO), the step S92 is skipped to maintain the desired rear-wheel driving force FCMD_MOT maintained, followed by terminating the program.

Next, a second embodiment of the present invention will be described particularly with reference to FIGS. 17 to 19. The present embodiment is distinguished from the first embodiment in that a step of determining whether or not the vehicle 2 is in a two-wheel drive state is added to the subroutine for the cruising-time recharge mode demand-determining process (FIGS. 5 to 7 in the first embodiment), as one of the conditions for determining the recharge mode. The other steps are identical to those of the first embodiment in terms of hardware as well as software, and hence description thereof is omitted.

Figure 17:
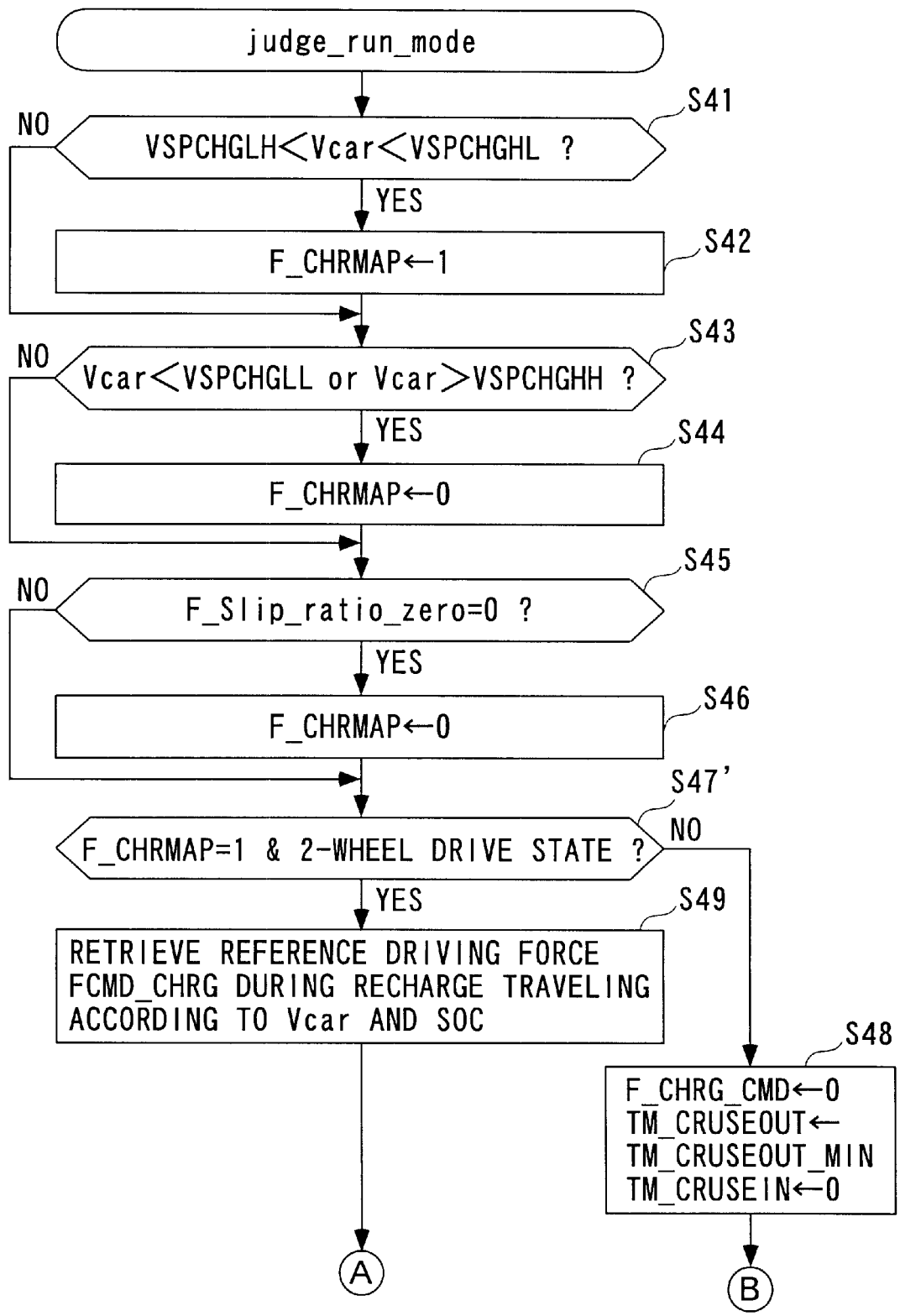
FIG. 17 is a flowchart of a subroutine for a cruising-time recharge mode demand-determining process, which is executed by a driving force control system according to a second embodiment of the invention, the subroutine corresponding to the FIG. 5 flowchart of the first embodiment.

In the present embodiment, it is determined at a step S47' in FIG. 17 whether or not the recharge traveling map lookup flag F_CHRMAP assumes "1" and at the same time the vehicle 2 is in a two-wheel drive state. If the answer to the question is negative (NO), i.e. if the vehicle speed Vcar is not within the predetermined range or if the zero adjustment of the rear-wheel slip ratio Slip_ratio has not been completed, or if the vehicle 2 is not in a two-wheel drive state, which means that the desired rear-wheel driving force FCMD_MOT is not equal to 0, it is judged that basic conditions for executing the recharge mode are not satisfied, and the program proceeds to a step S48. On the other hand, if the answer to the question of the step S47 is affirmative (YES), i.e. if the vehicle speed Vcar is within the predetermined range, the zero adjustment of the rear-wheel slip ratio Slip_ratio has been completed, and further if the vehicle 2 is in the two-wheel drive state, it is judged that the basic conditions for executing the cruising recharge mode are satisfied, and at a step S49, the recharge traveling map is looked up to retrieve a desired rear-wheel driving force FCMD_MOT according to the vehicle speed Vcar and the remaining charge SOC of the battery 7.

Figure 18:
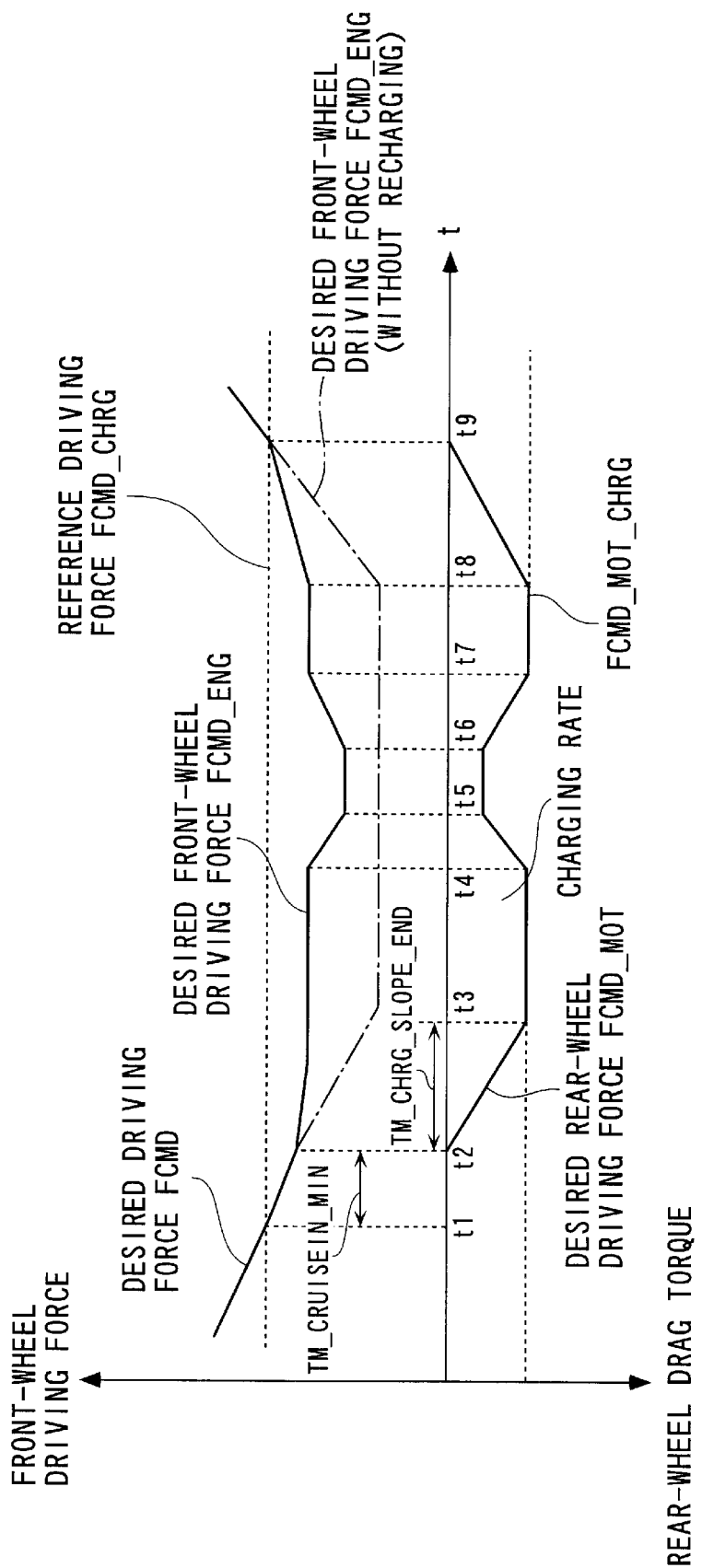
FIG. 18 is a timing chart showing an example of operation during and before and after execution of a cruising recharge mode.

FIG. 18 is a timing chart showing an example of operation during and before and after execution of the cruising recharge mode of the vehicle, which is achieved by a control process of the present embodiment including the control process already explained in the description of the first embodiment. First, assuming that the desired driving force FCMD is above the reference driving force FCMD_CHRG (before time t1), the answer to the question of the step S50 is negative (NO), so that it is judged that the vehicle 2 is not in a cruising condition, and hence recharge traveling is inhibited. In the illustrated example, the desired rear-wheel driving force FCMD_MOT is equal to 0, which means that the vehicle 2 is in a front-wheel drive state. When the desired driving force FCMD is reduced from this state to become below the reference driving force FCMD_CHRG (time t1), the answer to the question of the step S50 becomes affirmative (YES), so that it is judged that the vehicle 2 is in a cruising condition.

Thereafter, when the above state continues and the predetermined time period TM_CRUISEIN_MIN has elapsed (time t2), the answer to the step S51 becomes affirmative (YES), and recharge traveling is started. More specifically, the desired rear-wheel driving force FCMD_MOT is calculated as a negative value, i.e. a rear wheel drag torque, and the battery 7 is charged with the electrical energy at the charging rate corresponding to the rear wheel drag torque. At this time point, a driving force corresponding to the charging rate is added to the desired front-wheel driving force FCMD_ENG. Further, after the recharge traveling is started, the rear wheel drag torque is progressively increased in a stepwise manner by the calculation at the step S77 in FIG. 10 and reaches the desired calculated value FCMD_MOT_CHRG of the rear-wheel driving force during recharge (=FCMD−FCMD_CHRG) at a time t3 when the predetermined time period TM_CHRG_SLOPE_END has elapsed.

Then, when there occurs slipping of the rear wheels WR, and the rear-wheel slip ratio Slip_ratio becomes equal to or larger than the reference value CHRG_Slip_ratio (time t4), the answer to the question of the step S81 in FIG. 11 becomes affirmative (YES), so that limitation on the rear wheel drag torque or charging rate is started. In this case, as long as the rear-wheel slip ratio Slip_ratio is larger than the reference value CHRG_Slip_ratio, the rear wheel drag torque is reduced according to the Slip_ratio value, whereby the charging rate is further limited (time t4 to t5). As long as the rear-wheel slip ratio Slip_ratio is close to the reference value CHRG_Slip_ratio, the rear wheel drag torque is maintained without being corrected (time t5 to t6). Further, as long as the rear-wheel slip ratio Slip_ratio is equal to or smaller than the predetermined value Slip_ratio1, the rear wheel drag torque is increased to alleviate the limitation on the charging rate (time t6 to t7).

Thereafter, when the AP 17 is stepped on (time t8), the rear wheel drag torque progressively decreases with an increase in the desired driving force FCMD. Then, at a time point (time t9) when the desired driving force FCMD becomes equal to or larger than the reference driving force FCMD_CHRG, the answer to the question of the step S50 becomes negative (NO), and hence the cruising recharge mode is terminated.

As described above, according to the present embodiment, when the rear-wheel slip ratio Slip_ratio becomes equal to or larger than the reference value CHRG_Slip_ratio during execution of the cruising recharge mode, the rear wheel drag torque (corresponding to a charging rate at which the battery 7 is recharged) is reduced for limitation, so that it is possible to reliably prevent an excessive difference in speed between the front wheels WF and the rear wheels WR. As a result, e.g. when the vehicle 2 is traveling on a low-friction road in the cruising recharge mode, slipping of the rear wheels WR can be prevented positively, which ensures traveling stability of the vehicle 2. Further, since the rear wheel drag torque is limited according to the value of the rear-wheel slip ratio Slip ratio, it is possible to control the rear wheel drag torque properly according to the degree of actual frictional resistance of a road surface on which the vehicle 2 is running, thereby ensuring more excellent traveling stability.

Nest, the limitation on the charging rate (rate of regeneration of energy) during the decelerating regeneration mode will be described with reference to FIG. 19. In the decelerating regeneration mode, limitation on the charging rate is executed when the rear-wheel slip ratio Slip_ratio is equal to or larger than a reference value CHRG_Slip_ratio_DEC for use in the decelerating regeneration mode. The reference value CHRG_Slip_ratio_DEC is set to a larger value (e.g. 3%) than the reference value CHRG_Slip_ratio (e.g. 1%).

The reference value CHRG_Slip_ratio_DEC is thus set is for the following reason: In the cruising recharge mode, the front wheels WF and the rear wheels WR are driven in opposite directions, i.e. in an accelerating direction and in a decelerating direction, respectively, and further the front wheels WF receives an additional driving force, which is liable to cause an uncomfortable feeling of the driver. In contrast, in the decelerating regeneration mode, the front wheels WF and the rear wheels WR are driven in the same direction so that the driver is not given such a feeling. By setting the two reference values CHRG Slip ratio and CHRG_Slip_ratio_DEC differently, as described above, such that limitation on the charging rate can be started more promptly in the cruising recharge mode than in the decelerating regeneration mode, it is possible to ensure the drivability of the vehicle in dependence on the traveling condition thereof.

Figure 19:
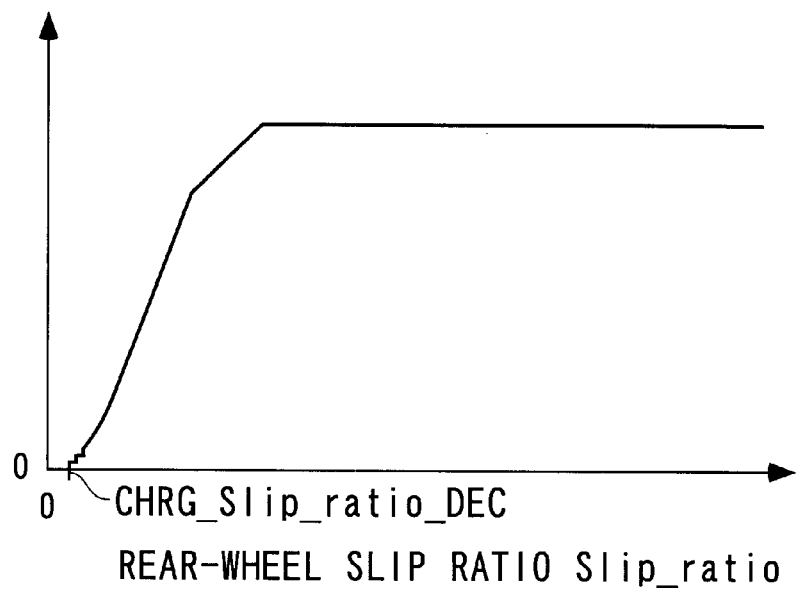
FIG. 19 is a diagram of an example of a charging rate-limiting correction value table for use in a decelerating regeneration mode which is executed in the second embodiment.

FIG. 19 shows an example of a charging rate limitation correction value KCHRG_LMT_DEC table for use in the decelerating regeneration mode. In this table, similarly to the table for use in the cruising recharge mode, in a range where the rear-wheel slip ratio Slip_ratio is equal to or larger than the reference value CHRG_Slip_ratio_DEC, a charging rate limitation correction value KCHRG_LMT_DEC is set to a larger positive value as the rear-wheel slip ratio Slip_ratio is larger. On the other hand, in a range where the rear-wheel slip ratio Slip_ratio is smaller than the reference value CHRG_Slip_ratio_DEC, the correction value KCHRG_LMT_DEC is set to 0, differently from the correction value KCHRG_LMT for use in the cruising recharge mode which is set to a negative value (see FIGS. 14 and 15).

More specifically, in the decelerating regeneration mode, when the rear-wheel slip ratio Slip_ratio becomes equal to or larger than the reference value CHRG_Slip_ratio_DEC, limitation on the charging rate is started, and even when the rear-wheel slip ratio Slip_ratio falls during execution of the limitation on the charging rate, the charging rate is maintained without being increased, differently from the cruising recharge mode described hereinabove. This is because during the decelerating running of the vehicle, the rotational speed of the rear wheels WF is also decreasing, and if the limitation on the charging rate is alleviated, the behavior of the vehicle 2 may become unnatural to give an uncomfortable feeling to the driver. Therefore, by setting the charging rate limitation correction value KCHRG_LMT_DEC as above, it is possible to positively avoid such an inconvenience, thereby enhancing drivability of the vehicle.

The present invention is not limited to the above embodiment, but it can be practiced in various forms. For instance, although in the above embodiments, the electromagnetic clutch 8 is used as a clutch for connection/disconnection between the motor 4 and the rear wheels WR, any clutch including a hydraulic multi-disc clutch may be employed so long as it is capable of controlling torque transmission capacity. Further, it is possible to use a large-sized motor for direct connection with the rear wheels and omit the electromagnetic clutch 8. Further, although in the above embodiments, the invention is applied to a front-and-rear wheel drive vehicle of a type in which front wheels thereof are driven by an engine and rear wheels thereof by a motor, this is not limitative, but the invention is also applicable to a vehicle of a type in which front wheels are driven by a motor and rear wheels thereof by an engine.

Further, in the second embodiment, although the rear-wheel slip ratio Slip_ratio is used as a parameter indicative of the difference in speed between the front wheels WF and the rear wheels WR, another proper parameter may be employed in place of the rear-wheel slip ratio Slip_ratio. Moreover, the rear-wheel slip ratio may be determined based on a general definition using the vehicle speed and rear-wheel speed, instead of being defined as the simplified rear-wheel slip ratio mentioned in the description of the first embodiment. Additionally, although in the above embodiments, the reference values for use in limiting the charging rate in the recharge mode are each set to a fixed value, variable values which vary e.g. with the vehicle speed may be used in place of the fixed values.

It is further understood by those skilled in the art that the foregoing is a preferred embodiment of the invention, and that various changes and modifications may be made without departing from the spirit and scope thereof.

What is claimed is:

1. A driving force control system for a front-and-rear wheel drive vehicle that is driven while switching between a drive mode for driving first drive wheels as one pair of respective pairs of front drive wheels and rear drive wheels by a first prime mover and driving second drive wheels as another pair of the respective pairs by a second prime mover, and a recharge mode for recovering running energy of the vehicle to thereby charge a drive source of the second prime mover with the running energy recovered as driving energy, the driving force control system comprising:
parameter detecting means for detecting a parameter indicative of a driving condition of the vehicle;
traveling condition-determining means for determining a traveling condition of the vehicle based on the parameter;
driving energy charge execution-determining means for determining, based on the traveling condition of the vehicle and a state of charge of the driving energy in the drive source, whether or not charging of the drive source with the driving energy is to be executed; and
energy charge-executing means for executing the charging of the drive source with the driving energy,
wherein said parameter detecting means includes accelerator pedal opening-detecting means for detecting an accelerator pedal opening, and vehicle speed-detecting means for detecting a vehicle speed, and
wherein aid traveling condition-determining means includes desired driving force-calculating means for calculating a desired driving force based on the detected accelerator pedal opening and the detected vehicle speed, reference driving force-storing means for storing a reference driving force which is set, based on a driving force of the vehicle required for cruising, to a larger value than the desired driving force, and driving force comparison means for performing a comparison between the desired driving force and the reference driving force, and
wherein the driving energy charge execution-determining means includes driving energy charge-permitting means for permitting the charging of the drive source with the driving energy when the driving force comparison means determines that the desired driving force is smaller than the reference driving force.

2. A driving force control system according to claim 1, wherein the reference driving force is a driving force of the vehicle required for cruising on a road having a predetermined upward slope.

3. A driving force control system according to claim 1, further comprising stored driving energy amount-detecting means for detecting a stored amount of the driving energy in the drive source, and reference driving force-correcting means for correcting the reference driving force according to a detected stored amount of the driving energy.

4. A driving force control system according to claim 1, further comprising driving energy charging-rate setting means for setting a charging rate at which the drive source is charged with the driving energy, according to a difference between the desired driving force and the reference driving force.

5. A driving force control system according to claim 2, further comprising stored driving energy amount-detecting means for detecting a stored amount of the driving energy in the drive source, and reference driving force-correcting means for correcting the reference driving force according to the detected stored amount of the driving energy.

6. A driving force control system according to claim 2, further comprising driving energy charging-rate setting means for setting a charging rate at which the drive source is charged with the driving energy, according to a difference between the desired driving force and the reference driving force.

7. A driving force control system according to claim 3, further comprising driving energy charging-rate setting means for setting a charging rate at which the drive source is charged with the driving energy, according to a difference between the desired driving force and the reference driving force.

8. A driving force control system according to claim 5, further comprising driving energy charging-rate setting means for setting a charging rate at which the drive source is charged with the driving energy, according to a difference between the desired driving force and the reference driving force.

9. A driving force control system for a front-and-rear wheel drive vehicle that is driven while switching between a drive mode for driving first drive wheels as one pair of respective pairs of front drive wheels and rear drive wheels by a first prime mover and driving second drive wheels as another pair of the respective pairs by a second prime mover, and a recharge mode for recovering running energy of the vehicle to thereby charge a drive source of the second prime mover with the running energy recovered as driving energy, the driving force control system comprising:

parameter detecting means for detecting a parameter indicative of a driving condition of the vehicle;

traveling condition-determining means for determining a traveling condition of the vehicle based on the parameter;

driving energy charge execution-determining means for determining, based on the traveling condition of the vehicle and a state of charge of the driving energy in the drive source, whether or not charging of the drive source with the driving energy is to be executed; and energy charge-executing means for executing the charging of the drive source with the driving energy, wherein said parameter detecting means includes first drive wheel speed-detecting means for detecting a speed of the first drive wheels, and second drive wheel speed-detecting means for detecting a speed of the second drive wheels, and wherein said traveling condition-determining means includes drive wheel speed comparison means for performing a comparison between the detected speed of the first drive wheels and the detected speed of the second drive wheels, and wherein the driving force control system further comprising driving energy charging rate-limiting means for limiting a charging rate at which the drive source is charged with the driving energy, when the drive wheel speed comparison means determines, during the recharge mode, that the speed of the second drive wheels has become lower than the speed of the first drive wheels by more than a predetermined value.

10. A driving force control system according to claim 9, wherein said driving energy charging rate-limiting means limits the charging rate of the driving energy in dependence on a degree of decrease in the speed of the second drive wheels relative to the speed of the first drive wheels.

11. A driving force control system according to claim 9, wherein the recharge mode includes a decelerating traveling-time recharge mode to be executed during decelerating traveling of the vehicle, and a non-decelerating traveling-time recharge mode to be executed during non-decelerating traveling of the vehicle, the predetermined value for use in the non-decelerating traveling-time recharge mode being set to a smaller value than the predetermined value for use in the decelerating traveling-time recharge mode.

12. A driving force control system according to claim 10, wherein the recharge mode includes a decelerating traveling-time recharge mode to be executed during decelerating traveling of the vehicle, and a non-decelerating traveling-time recharge mode to be executed during non-decelerating traveling of the vehicle, the predetermined value for use in the non-decelerating traveling-time recharge mode being set to a smaller value than the predetermined value for use in the decelerating traveling-time recharge mode.

* * * * *